(12) United States Patent
Heidrich et al.

(10) Patent No.: US 11,002,856 B2
(45) Date of Patent: May 11, 2021

(54) DOPPLER TIME-OF-FLIGHT IMAGING

(71) Applicants: KING ABDULLAH UNIVERSITY OF SCIENCE AND TECHNOLOGY, Thuwal (SA); UNIVERSITY OF BRITISH COLUMBIA, Vancouver (CA); STANFORD UNIVERSITY, Stanford, CA (US); BONN UNIVERSITY, Bonn (DE)

(72) Inventors: Wolfgang Heidrich, Thuwal (SA); Felix Heide, Vancouver (CA); Gordon Wetzstein, Stanford, CA (US); Matthias Hullin, Bonn (DE)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 443 days.

(21) Appl. No.: 15/739,854

(22) PCT Filed: Aug. 5, 2016

(86) PCT No.: PCT/IB2016/054761
§ 371 (c)(1),
(2) Date: Dec. 26, 2017

(87) PCT Pub. No.: WO2017/025885
PCT Pub. Date: Feb. 16, 2017

(65) Prior Publication Data
US 2019/0154834 A1 May 23, 2019

Related U.S. Application Data

(60) Provisional application No. 62/282,708, filed on Aug. 7, 2015.

(51) Int. Cl.
*G01S 17/89* (2020.01)
*G01S 17/58* (2006.01)
(Continued)

(52) U.S. Cl.
CPC ............ *G01S 17/89* (2013.01); *G01S 7/4911* (2013.01); *G01S 17/34* (2020.01); *G01S 17/58* (2013.01)

(58) Field of Classification Search
CPC ........ G01S 17/89; G01S 17/34; G01S 7/4911; G01S 17/58
See application file for complete search history.

(56) References Cited

U.S. PATENT DOCUMENTS 6,246,482 B1 * 6/2001 Kinrot ..................... G01D 5/26
356/499
8,446,575 B1 5/2013 Reu et al.
(Continued)

FOREIGN PATENT DOCUMENTS

EP 2890125 A1 7/2015
WO 2013012335 A1 1/2013

OTHER PUBLICATIONS

Heide, Felix, et al., "Doppler Time-of-Flight Imaging," ACM Transaction on Graphics, Jul. 27, 2015, vol. 34, No. 4, Article 36, pp. 36-1-36-11.
(Continued)

*Primary Examiner* — Hovhannes Baghdasaryan
(74) *Attorney, Agent, or Firm* — Patent Portfolio Builders PLLC

(57) ABSTRACT

Systems and methods for imaging object velocity are provided. In an embodiment, at least one Time-of-Flight camera is used to capture a signal representative of an object in motion over an exposure time. Illumination and modulation frequency of the captured motion are coded within the exposure time. A change of illumination frequency is mapped to measured pixel intensities of the captured motion within the exposure time, and information about a Doppler shift in the illumination frequency is extracted to obtain a measurement of instantaneous per pixel velocity of the
(Continued)

object in motion. The radial velocity information of the object in motion can be simultaneously captured for each pixel captured within the exposure time. In one or more aspects, the illumination frequency can be coded orthogonal to the modulation frequency of the captured motion. The change of illumination frequency can correspond to radial object velocity.

20 Claims, 24 Drawing Sheets

(51) Int. Cl.
    *G01S 17/34*         (2020.01)
    *G01S 7/4911*      (2020.01)

(56) References Cited

U.S. PATENT DOCUMENTS

| | | | |
|---|---|---|---|
| 2004/0118624 A1* | 6/2004 | Beuhler | G01S 17/58 180/167 |
| 2007/0146722 A1* | 6/2007 | Trutna, Jr. | G01D 5/266 356/487 |
| 2009/0059201 A1* | 3/2009 | Willner | G01S 17/32 356/5.01 |
| 2011/0032508 A1* | 2/2011 | Ludwig | G01S 17/36 356/5.01 |
| 2014/0240528 A1* | 8/2014 | Venkataraman | H04N 5/2252 348/218.1 |
| 2015/0084951 A1* | 3/2015 | Boivin | G06T 19/006 345/419 |
| 2015/0249496 A1* | 9/2015 | Muijs | H05B 45/20 398/118 |
| 2015/0355330 A1* | 12/2015 | Oberhammer | G01S 17/26 356/5.01 |

OTHER PUBLICATIONS

International Search Report in related International Application No. PCT/IB2016/054761, dated Dec. 22, 2016.
Written Opinion of the International Searching Authority in related International Application No. PCT/IB2016/054761, dated Dec. 22, 2016.
Hoegg, T., et al., "Time-of-Flight Camera Based 3D Point Cloud Reconstruction of a Car," Computers in Industry Journal, Dec. 2013, vol. 64, No. 9, pp. 1099-1114.
Barron, J.L., et al., "Performance of Optical Flow Techniques," International Journal of Computer Vision, vol. 12, No. 1, Feb. 1994, pp. 43-47 (60 pages provided).
Boreman, G.D., "Detector Footprint Modulation Transfer Function," Excerpt from Modulation Transfer Function in Optical and Electro-Optical Systems, SPIE Publications, Chapter 2.1, Jul. 1, 2001, 3 pages.
Büttgen, B., et al., "Robust Optical Time-of-Flight Range Imaging Based on Smart Pixel Structures," IEEE Transactions on Circuits and Systems—I: Regular Papers, vol. 55, No. 6, Jul. 2008, pp. 1512-1525 (15 pages provided).
Ceperley, P., "Resonances, Waves and Fields," URL: http://resonanceswavesandfields.blogspot.com/2011/04/28-valid-method-of-multiplying-two, Accessed Online Jan. 20, 2015, 16 pages.
Doppler, C.J., "Über das farbige Licht der Doppelsterne und einiger anderer Gestirne des Himmels," Abhandlungen der Königl. Böhm. Gesellschaft der Wissenschaften, vol. 12, No. 2, 1842, pp. 465-482 (20 pages) (Discussed in present specification commencing at p. 20).
Dorrington, A.A., et al., "Achieving sub-millimetre precision with a solid-state full-field heterodyning range imaging camera," Measurement Science and Technology, vol. 18, Jul. 20, 2007, pp. 2809-2816 (9 pages).
Erz, M., et al., "Radiometric and Spectrometric Calibrations, and Distance Noise Measurement of ToF Cameras," Dynamic 3D Imaging, LNCS vol. 5742, Sep. 9, 2009, pp. 28-41.
Gokturk, S.B., et al., "A Time-Of-Flight Depth Sensor—System Description, Issues and Solutions," Proceedings of the 2004 IEEE Computer Society Conference on Computer Vision and Pattern Recognition Workshops (CVPRW'04), May 27-Jun. 2, 2004, 9 pages.
Gu, J., et al., "Coded Rolling Shutter Photography: Flexible Space-Time Sampling," Proceedings of the IEEE International Conference on Computational Photography (ICCP 2010), Mar. 2010, 8 pages.
Gupta, M., et al., "Phasor Imaging: A Generalization of Correlation-Based Time-of-Flight Imaging," ACM Transactions on Graphics, vol. 34, No. 5, Article 156, Oct. 2015, pp. 156:1-156:18.
Heide, F., et al., "Diffuse Mirrors: 3D Reconstruction from Diffuse Indirect Illumination Using Inexpensive Time-of-Flight Sensors," Proceedings of the CVPR, IEEE Conference on Computer Vision and Pattern Recognition (CVPR), Jun. 23-28, 2014, 8 pages.
Heide, F., et al., "Imaging in scattering media using correlation image sensors and sparse convolutional coding," OSA Optics Express, vol. 22, No. 21, Oct. 20, 2014 (published Oct. 17, 2014), pp. 26338-26350.
Heide, F., et al., "Low-budget Transient Imaging using Photonic Mixer Devices," ACM Transactions on Graphics (Proc. SIGGRAPH 2013), vol. 32, No. 4, Article 45, Jul. 2013, 10 pages.
Honegger, D., et al., "An Open Source and Open Hardware Embedded Metric Optical Flow CMOS Camera for Indoor and Outdoor Applications," Proceedings of the IEEE International Conference on Robotics and Automation, May 2013, pp. 1736-1741 (6 pages).
Hontani, H., et al., "Local Estimation of High Velocity Optical Flow with Correlation Image Sensor," Proceedings of the European Conference on Computer Vision (ECCV 2014), Part III, LNCS vol. 8691, Sep. 6-12, 2014, pp. 235-249.
Horn, B., et al., "Determining Optical Flow," Artificial Intelligence, vol. 17, Issues 1-3, Aug. 1981, pp. 185-203.
Kadambi, A., et al., "Coded Time of Flight Cameras: Sparse Deconvolution to Address Multipath Interference and Recover Time Profiles," ACM Transactions on Graphics (SIGGRAPH Asia), vol. 32, No. 6, Article 167, Nov. 2013, pp. 167:1-167:10.
Kirmani, A., et al., "Looking Around the Corner using Transient Imaging," Proceedings of the IEEE 12th International Conference on Computer Vision (ICCV), Sep. 29-Oct. 2, 2009, pp. 159-166 (8 pages).
Lange, R., et al., "Solid-State Time-of-Flight Range Camera," IEEE Journal of Quantum Electronics, vol. 37, No. 3, Mar. 2001, pp. 390-397.
Lindner, M., et al., "Lateral and Depth Calibration of PMD-Distance Sensors," Advances in Visual Computing, LCNS 4292, Nov. 6-8, 2006, pp. 524-533 (10 pages).
Liu, C., "Beyond Pixels: Exploring New Representations and Applications for Motion Analysis," PhD Thesis submitted to the Massachusetts Institute of Technology, Jun. 2009, pp. 1-164.
Liu, C., et al., "SIFT Flow: Dense Correspondence across Different Scenes," Computer Vision—ECCV 2008, 10th European Conference on Computer Vision, Proceedings, Part III, LNCS 5304, Oct. 12-18, 2008, pp. 28-42.
Naik, N., et al., "Single View Reflectance Capture using Multiplexed Scattering and Time-of-flight Imaging," ACM Transactions on Graphics (SIGGRAPH Asia 2011 Proceedings), vol. 30, No. 6, Article 171, Dec. 2011, pp. 1-10 (11 pages total).
O'Toole, M., et al., "Temporal Frequency Probing for 5D Transient Analysis of Global Light Transport," ACM Transactions on Graphics (SIGGRAPH), vol. 33, No. 4, Article 87, Jul. 2014, 11 pages.
Pandharkar, R., et al., "Estimating Motion and Size of Moving Non-Line-of-Sight Objects in Cluttered Environments," Proceedings of the 2011 IEEE Conference on Computer Vision and Pattern Recognition (CVPR), Jun. 20-25, 2011, pp. 265-272.
Tocci, M.D., et al., "A Versatile HDR Video Production System," ACM Transactions on Graphics (SIGGRAPH), vol. 30, No. 4, Article 41, Jul. 2011, 9 pages.
Velten, A., et al., "Femto-Photography: Capturing and Visualizing the Propagation of Light," ACM Transactions on Graphics (SIGGRAPH), vol. 32, No. 4, Article 44, Jul. 2013, 8 pages.

(56) References Cited

OTHER PUBLICATIONS

Velten, A., et al., "Recovering Three-dimensional Shape Around a Corner using Ultra-fast Time-of-Flight Imaging," Nature Communications, vol. 3, No. 745, Mar. 20, 2012, pp. 1-10.
Wei, D., et al., "Optical flow determination with complex-sinusoidally modulated imaging," Proceedings of the IEEE 8th International Conference on Signal Processing (ICSP), vol. 2, Nov. 16-20, 2006, 6 pages.
Wu, D., et al., "Frequency Analysis of Transient Light Transport with Applications in Bare Sensor Imaging," Proceedings of the 12th European Conference on Computer Vision (ECCV 2012), LNCS vol. 7572, Oct. 7-13, 2012, pp. 542-555 (14 pages).
Yasuma, F., et al., "Generalized Assorted Pixel Camera: Postcapture Control of Resolution, Dynamic Range, and Spectrum," IEEE Transactions on Image Processing, vol. 19, No. 9, Sep. 2010, pp. 2241-2253.

* cited by examiner

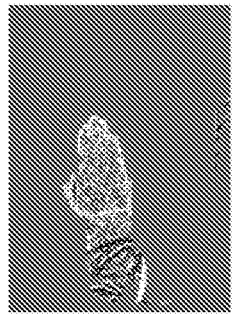
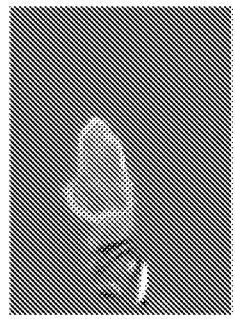
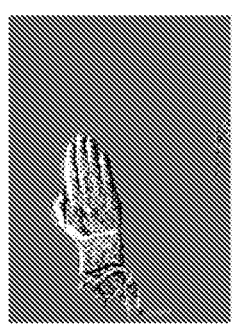
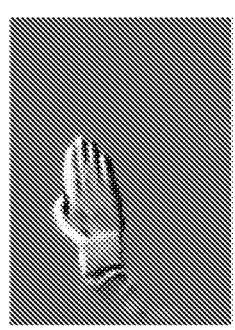
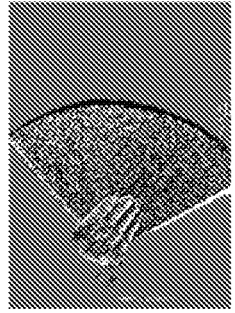
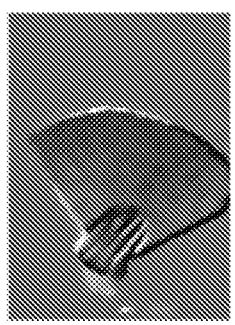
FIG. 9A
FIG. 9B

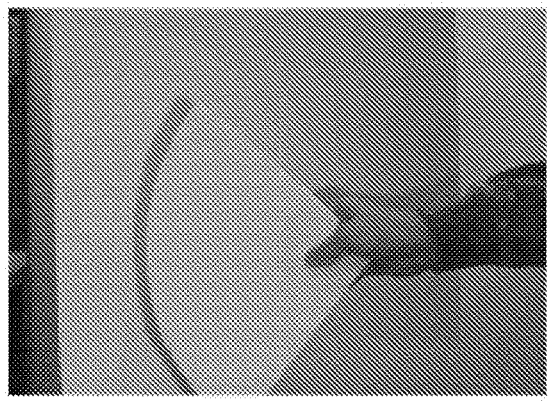
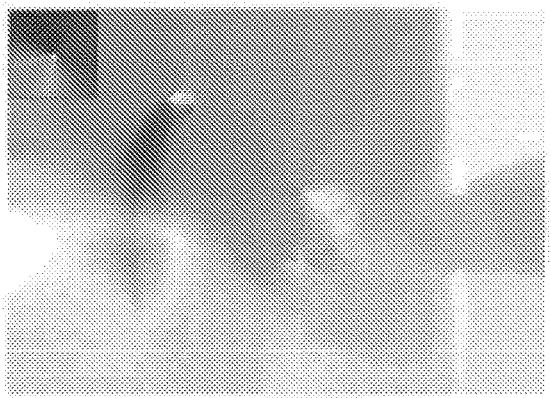
FIG. 15A  FIG. 15B
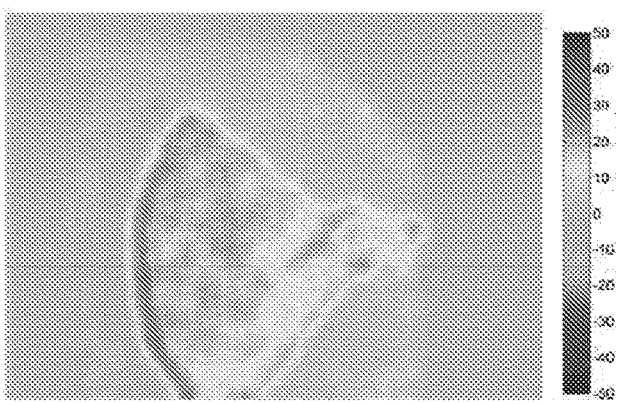
FIG. 15C  FIG. 15D

DOPPLER TIME-OF-FLIGHT IMAGING

CROSS-REFERENCE TO RELATED DOCUMENTS

This application is a U.S. National Stage of International Application No. PCT/IB2016/054761, filed Aug. 5, 2016, which claims priority to, and the benefit of, U.S. provisional patent application 62/282,708, filed Aug. 7, 2015, the contents of which are incorporated herein by reference in their entirety.

This application also makes reference to and incorporates by reference and the following paper as if it were fully set forth herein expressly in its entirety: Doppler Time-of-Flight Imaging, Appendix B.

TECHNICAL FIELD

The present disclosure generally relates to depth cameras and motion of objects captured by such cameras.

BACKGROUND

Pioneers of photography, including Eadweard Muybridge and Harold "Doc" Edgerton, advanced imaging technology to reveal otherwise invisible motions of high-speed events. Today, understanding the motion of objects in complex scenes is at the core of computer vision, with a wide range of applications in object tracking, segmentation, recognition, motion de-blurring, navigation of autonomous vehicles, and defense.

Usually, object motion or motion parallax is estimated via optical flow [Horn and Schunck 1981]: recognizable features are tracked across multiple video frames. The computed flow field provides the basis for many computer vision algorithms, including depth estimation. Unfortunately, optical flow is computationally expensive, fails for untextured scenes that do not contain good features to track, and only measures 2D lateral motion perpendicular to the camera's line of sight. Further, the unit of optical flow is pixels; metric velocities cannot be estimated unless depth information of the scene is also available.

Over the last few years, depth cameras have become increasingly popular for a range of applications, including human-computer interaction and gaming, augmented reality, machine vision, and medical imaging. For the particular application of depth estimation, many limitations of optical flow estimation can be overcome using active illumination, as done by most structured illumination and time-of-flight (ToF) cameras where active illumination is temporally coded and analyzed on the camera to estimate a per-pixel depth map of the scene. With the emergence of RGB-D imaging, for example facilitated by Microsoft's Kinect One1, complex and untextured 3D scenes can be tracked by analyzing both color and depth information, resulting in richer visual data that has proven useful for many applications. These approaches, however, still have limitations in the capture of motion.

SUMMARY

We provide a fundamentally new imaging modality for depth cameras, in particular time-of-flight (ToF) cameras, and the capture of motion of objects. In an embodiment we provide per-pixel velocity measurement. Our technique can exploit the Doppler effect of objects in motion, which shifts the temporal frequency of the illumination before it reaches the camera. Using carefully coded illumination and modulation frequencies of the ToF camera, object velocities can directly map to measured pixel intensities.

In an embodiment our imaging system allows for color, depth, and velocity information to be captured simultaneously. Combining the optical flow computed on the RGB frames with the measured metric radial velocity allows estimation of the full 3D metric velocity field of the scene. The present technique has applications in many computer graphics and vision problems, for example motion tracking, segmentation, recognition, and motion de-blurring.

In an embodiment, provided is a method for imaging object velocity. The method can comprise the steps of: providing a Time-of-Flight camera and using the Time-of-Flight camera to capture a signal representative of an object in motion over an exposure time; coding illumination and modulation frequency of the captured motion within the exposure time; mapping a change of illumination frequency to measured pixel intensities of the captured motion within the exposure time; and extracting information about a Doppler shift in the illumination frequency to obtain a measurement of instantaneous per pixel velocity of the object in motion. In any one or more aspects, radial velocity information of the object in motion can be simultaneously captured for each pixel captured within the exposure time. The illumination frequency can be coded orthogonal to the modulation frequency of the captured motion. The change of illumination frequency can correspond to radial object velocity.

In any one or more aspects, the Time-of-Flight camera can have a receiver and a transmitter, and the frequency of the receiver can be configured to be orthogonal to the frequency of the transmitter. The exposure time can be longer than the wavelength of a modulated captured signal. A ratio of a heterodyne measurement and a homodyne measurement can be determined to extract the information about the Doppler shift. The method can further include the step of: simultaneously capturing color, depth and velocity information concerning the object in motion during the exposure time. The change of illumination frequency can correspond to radial object velocity, and optical flow of the object in motion can be computed on red, green and blue (RGB) frames within a measured change in illumination frequency. The method can further include estimating a 3D velocity field for the object in motion. The depth and velocity imaging can be combined using either the Time-of-Flight camera by alternating modulation frequencies between successive video frames over the exposure time or using at least two Time-of-Flight cameras.

In an embodiment, we provide a system for imaging object velocity. The system can comprise: at least one device for capturing a signal representative of an object in motion over an exposure time; at least one computing device comprising a processor and a memory; and an application executable in the at least one computing device, the application comprising machine readable instructions stored in the memory that, when executed by the processor, cause the computing device to at least: (a) code illumination and modulation frequency of the captured motion within the exposure time; (b) map a change of illumination frequency to measured pixel intensities of the captured motion within the exposure time; and (c) extract information about a Doppler shift in the illumination frequency to obtain a measurement of instantaneous per pixel velocity of the object in motion. The device can be at least one Time-of-Flight camera.

In an embodiment, we provide a non-transitory computer readable medium employing an executable application in at least one computing device, the executable application comprising machine readable instructions stored in the medium that: (a) receives signals representative of an object in motion over an exposure time; (b) codes illumination and modulation frequency of the captured motion within the exposure time; (c) maps a change of illumination frequency to measured pixel intensities of the captured motion within the exposure time; and (d) extracts information about a Doppler shift in the illumination frequency to obtain a measurement of instantaneous per pixel velocity of the object in motion. The signals can be captured using at least one Time-of-Flight camera.

In any one or more aspects of the system or the computer readable medium, radial velocity information of the object in motion can be simultaneously captured for each pixel captured within the exposure time. The illumination frequency can be coded orthogonal to the modulation frequency of the captured motion. The change of illumination frequency can correspond to radial object velocity. The Time-of-Flight camera can include a receiver and a transmitter, and the frequency of the receiver can be configured to be orthogonal to the frequency of the transmitter. The logic can capture color, depth and velocity information concerning the object in motion during the exposure time.

Other systems, methods, features, and advantages of the present disclosure for Doppler time-of-flight imaging, will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 9A depicts computed velocity maps encoded in grayscale from raw measurements.

FIG. 9B depicts reconstructed de-noised images based on the velocity maps encoded in grayscale from raw measurements of FIG. 9A.

FIG. 15A depicts a failure case of optical flow for a moving, but un-textured, scene (left).

FIG. 15B shows Optical flow [Liu 2009] for two succeeding frames of the scene from FIG. 15A. The 2D flow vectors can be color-coded with a color wheel (insets).

FIG. 15C shows SIFT flow [Liu et al. 2008] for two succeeding frames of the scene from FIG. 15A. The 2D flow vectors can be color-coded with a color wheel (insets).

FIG. 15D shows velocity data from the scene of FIG. 15A according to the system and methods described herein.

DETAILED DESCRIPTION

Figure 1B:
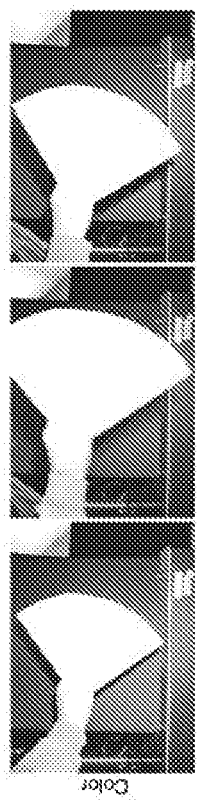
FIG. 1B depicts images that can captured by an imaging system of the present disclosure of an example of an object in motion.
Figure 1C:
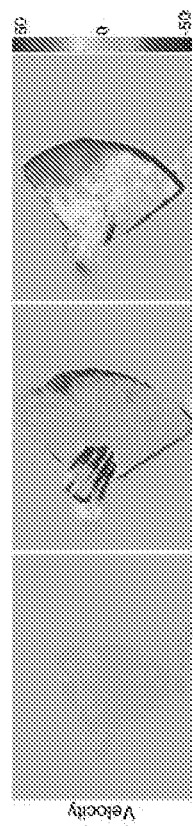
FIG. 1C depicts velocity data that can captured by an imaging system of the present disclosure of an example of an object in motion.
Figure 1D:
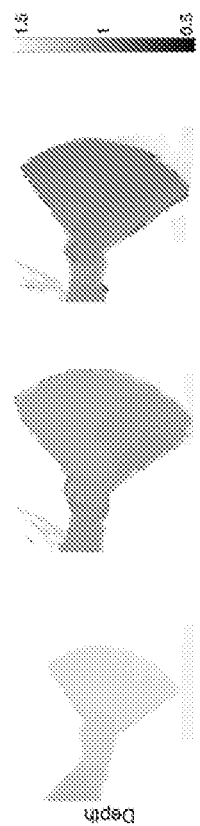
FIG. 1D depicts depth data that can captured by an imaging system of the present disclosure of an example of an object in motion.

Described below are various embodiments of the present systems and methods for Doppler Time-of-Flight (ToF) imaging. Although particular embodiments are described, those embodiments are mere exemplary implementations of the system and method. One skilled in the art will recognize other embodiments are possible. All such embodiments are intended to fall within the scope of this disclosure. Moreover, all references cited herein are intended to be and are hereby incorporated by reference into this disclosure as if fully set forth herein. While the disclosure will now be described in reference to the above drawings, there is no intent to limit it to the embodiment or embodiments disclosed herein. On the contrary, the intent is to cover all alternatives, modifications and equivalents included within the spirit and scope of the disclosure.

Discussion

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

It is to be understood that, unless otherwise indicated, the present disclosure is not limited to particular materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Description

Provided herein is a new approach to directly imaging radial object motion. In an aspect, the motion can be velocity. In an aspect, a Doppler effect can be analyzed in one or more Time-of-Flight cameras: object motion towards or away from the cameras can shift the temporal illumination frequency before it is recorded by the camera. Conventional Time-of-Flight cameras encode phase information (and therefore scene depth) into intensity measurements. Instead, in various aspects herein Doppler Time-of-Flight (D-ToF) is used to provide a new imaging mode, whereby the change of illumination frequency (corresponding to radial object velocity) can be directly encoded into the measured intensity. In an aspect, the camera hardware utilized can be the same as for conventional Time-of-Flight imaging, but illumination and modulation frequencies can be carefully designed. Depth and velocity imaging can be combined using either two Time-of-Flight cameras or using the same device by alternating the modulation frequencies between successive video frames; color images can be obtained with a conventional camera.

In various aspects, a fundamentally new imaging modality is provided that is ideally suited for fast motion. Optical flow applied to conventional RGB video is a complimentary technique: together, optical flow and D-ToF allow for the metric 3D velocity field to be estimated, which is otherwise not easily possible. In general, however, the present D-ToF can be independent of the RGB flow and can work robustly for cases where optical flow often fails, including untextured scenes and extremely high object velocities.

Doppler radar is widely used in police speed guns, although gradually being replaced by lidar-based systems. Doppler lidar is also commonly used in many meteorological applications, such as wind velocity estimation. One common limitation of all Doppler measurements is that only movement along one particular direction, usually the line-of-sight, can be detected. All of these applications rely on the wave nature of light or sound, and therefore require coherent illumination or precise spectroscopic measurement apparatuses. In one or more aspects herein, incoherent, amplitude-modulated illumination and inexpensive time-offlight (ToF) cameras can be used for instantaneous imaging of both velocity and range. In various aspects, a full-field imaging method is provided, meaning that it does not require the scene to be sequentially scanned unlike most existing Doppler radar or lidar systems that only capture a single scene point at a time.

In an aspect, a framework and a camera system are provided implementing the described techniques; together, they can optically encode object velocity into per-pixel measurements of modified time-of-flight cameras. By combining multiple cameras, color, range, and velocity images can be captured simultaneously.

Pandharkar et al. [2011] recently proposed a pulsed femtosecond illumination source to estimate motion of non-line-of-sight objects from differences in multiple captured images. In contrast, in an aspect, the present systems and methods can use the Doppler effect observed with conventional time-of-flight cameras within a single captured frame, as opposed to optical flow methods that track features between successive video frames.

Optical flow [Horn and Schunck 1981; Barron et al. 1994] is a fundamental technique in computer vision that is vital for a wide range of applications, including tracking, segmentation, recognition, localization and mapping, video interpolation and manipulation, as well as defense. Optical flow from a single camera is restricted to estimating lateral motion whereas the Doppler is observed only for radial motion towards or away from the camera.

Wei et al. [2006] and Hontani et al. [2014] have demonstrated how to use correlation image sensors to estimate optical flow of fast motion. Although correlation image sensors are conceptually similar to ToF cameras, their methods are more similar in spirit to conventional optical flow by targeting lateral, rather than radial motion.

In contrast to these methods, in an aspect the present systems and methods can use the Doppler effect of object motion to estimate per-pixel radial velocity without the need for optical flow. Lindner and Kolb [2009] as well as Hoegg et al. [2013] estimate lateral optical flow to compensate for object motion between the sequentially-captured ToF phase images from which depth is usually estimated. A similar strategy can be applied herein to mitigate alignment artifacts when sub-frames are captured sequentially, but the flow is not a core part of D-ToF.

In one or more aspects, also provided herein is a mode for simultaneous range and velocity imaging. As with standard ToF imaging, the present method can involve the capture of a few sub-frames with different modulation signals. Using appropriate hardware (for example, multi-sensor cameras or custom sensors with different patterns multiplexed into pixels of a single sensor), the method can be implemented as a true snapshot imaging approach. In the present systems and methods, rapid time-sequential, (for example, 30-60 frames per second, and even higher with specialized equipment) can be used to capture the required sub-frames.

In summary among other things:

D-ToF is presented herein as a new modality of computational photography that allows for direct estimation on instantaneous radial velocity. In an aspect using multiple captures or implemented with multi-sensor setups, it can record velocity, range, and color information.

A framework for velocity estimation with Time-of-Flight cameras is provided, along with a Time-of-Flight imaging system, and the framework and system validated in simulation and with the system.

Evaluation of the imaging system using a range of different types of motion, for textured and untextured surfaces as well as indoors and under strong outdoor ambient illumination is also provided.

It is demonstrated that the velocities measured with our system and method can be combined with RGB flow, allowing for the metric 3D velocity field to be estimated on a per-pixel basis.

Time-of-Flight Imaging

Time-of-flight cameras operate in continuous wave mode. That is, a light source illuminates the scene with an amplitude-modulated signal that changes periodically over time. Sinusoidal waves are often used in the ToF literature to approximate the true shape of the signals. We restrict the derivation herein to the sine wave model for simplicity of notation. Hence, the light source emits a temporal signal of the form $$g(t) = g_1 \cos(\omega_g t) + g_0, \quad (1)$$

where $\omega_g$ is the illumination frequency. Assuming that the emitted light is reflected along a single, direct path by a stationary diffuse object at distance d, and that it is observed by a camera co-located with the light source, the signal reaching the camera is $$s(t) = s_1 \cos\left(\omega_g\left(t - \frac{2d}{c}\right)\right) + s_0 \qquad (2)$$
$$= s_1 \cos(\omega_g t + \phi) + s_0,$$

with $s_o = g_0 + b$, where b is the ambient illumination. In the case of a stationary scene, the frequency at the camera is the same as the illumination frequency: $\omega_s = \omega_g$. In Equation 2, the amplitude $s_1$ combines the illumination amplitude $g_1$, geometric factors such as the square distance falloff, as well as the albedo of the object. Due to the propagation distance, the phase of the received signal is shifted by $\phi = -2d/c \cdot \omega_g$.

Theoretically, s(t) can be directly sampled to estimate $\phi$. However, illumination frequencies are usually in the order of tens to hundreds of MHz. Conventional solid state image sensors only provide sampling rates that are orders of magnitudes lower, and are hence inadequate for direct sampling of the phase. To overcome this limitation, Time-of-Flight camera pixels can provide a feature that makes them distinct from conventional camera pixels: before being digitally sampled, the incident signal can be modulated by a high-frequency, periodic function $f\psi(t)$ within each pixel. In various aspects, the modulation frequency can be 10 MHz-1 GHz, 10 MHz-800 MHz, 10 MHz-600 MHz, 10 MHz-500 MHz, 10 MHz-400 MHz, 10 MHz-300 MHz, 10 MHz-200 MHz, or 10 MHz-100 MHz.

This on-sensor modulation can be physically performed by an electric field that rapidly redirects incident photons-converted-to-electrons into one of two buckets within each pixel. The phase and frequency $\omega_f$ of the modulation function are programmable. The general equation for the modulated signal is thus $$\tilde{i}_\psi(t) = f_\psi(t) \cdot s(t) = \cos(\omega_f t + \psi) \cdot (s_1 | \cos(\omega_g t + \phi) + s_0) \qquad (3)$$
$$= \frac{s_1}{2}\cos((\omega_f - \omega_g)t + \psi - \phi) + \frac{s_1}{2}\cos((\omega_f + \omega_g)t + \psi + \phi) +$$
$$s_0 \cos(\omega_f t + \psi).$$

Usually, ToF cameras are operated in a homodyne mode where the illumination frequency and the reference frequency are identical: $\omega_f = \omega_g = \omega$. Under the common assumption of a stationary scene, we moreover get $\omega_s = \omega_g = \omega$, and Equation 3 simplifies to $$\tilde{i}_\psi(t) = \frac{s_1}{2}\cos(\psi - \phi) + \frac{s_1}{2}\cos(2\omega t + \phi + \psi) + s_0 \cos(\omega t + \psi). \qquad (4)$$

To model the discretely sampled quantities measured by the sensor, we can account for a finite integration (exposure) time. The exposure time T of all cameras can act as a low-pass filter on the modulated signal before it is discretized by the sampling process of the sensor. Since the exposure time is usually significantly longer than the wavelength of the modulated signal $T \gg 1/\omega$, all frequency-dependent terms in Equation 4 vanish:

$$i_\psi(t') = (\tilde{i}_\psi * rect_T)(t') \approx \frac{s_1}{2}\cos(\psi - \phi). \qquad (5)$$

The temporal low-pass filter $rect_T(\cdot)$ is convolved with the incident signal—an operation that is analogous to the finite integration area of each sensor pixel in the spatial domain. In the optics community, the low-pass filter resulting from spatial sensor integration is known as the detector footprint modulation transfer function [Boreman 2001]. Finally, the modulated and low-pass filtered signal can be discretely sampled. Since Equation 5 is independent of the time of measurement t', depth and albedo can be robustly estimated.

To distinguish the continuous function $i_\psi(t')$ from its discrete counterpart, we denote the latter as $i_\psi[t']$. For depth estimation, two measurements $i_0[t']$ and $i_{\pi/2}[t']$ and $i_{\pi/2}[t']$ can be made that are usually recorded in quick succession, such that phase and depth can be estimated as $$\phi_{est}[t'] = \tan^{-1}\left(\frac{i_{\pi/2}[t']}{i_0[t']}\right), \text{ and } d_{est}[t'] = \frac{c\phi_{est}[t']}{2\omega}. \qquad (6)$$

The same measurements can also be used to estimate the albedo:

$$s_{1\,est}[t'] = \sqrt{(i_0[t'])^2 + (i_{\pi/2}[t'])^2}, \qquad (1)$$

More detailed discussions of the basic principle of operation of Time-of-Flight cameras can be found in the literature [Lange and Seitz 2001; Gokturk et al. 2004; Büttgen and Seitz 2008].

Time-of-Flight for Objects in Motion

The conventional Time-of-Flight image formation model breaks down when objects of interest move with a non-negligible radial velocity. In this case, the illumination frequency undergoes a Doppler shift [Doppler 1842] when reflected from an object in motion. The illumination arriving at the sensor is now frequency-shifted to $\omega_s = \omega_g + \Delta\omega$, where the change in temporal frequency $\Delta\omega$ depends on the radial object velocity as well as the illumination frequency:

$$\Delta\omega = \frac{v}{c}\omega_g. \qquad (8)$$

Consider the case of an approximately constant velocity v throughout the exposure time. If one assumes a homodyne setting with $\omega_f = \omega_g = \omega$, Equation 3 can be used to derive a new version of the low-pass filtered sensor image (Eq. 5) for moving scenes:

$$i_\psi(t') \approx \frac{s_1}{2}\cos(-\Delta\omega t' + \psi - \phi). \qquad (9)$$

Figure 2A:
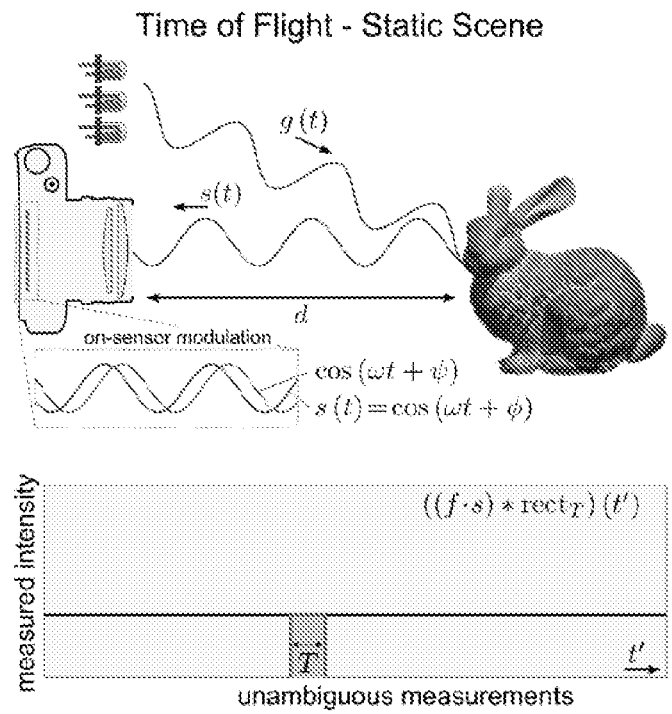
FIG. 2A depicts an embodiment of depth imaging of the present disclosure for a static scene.
Figure 2B:
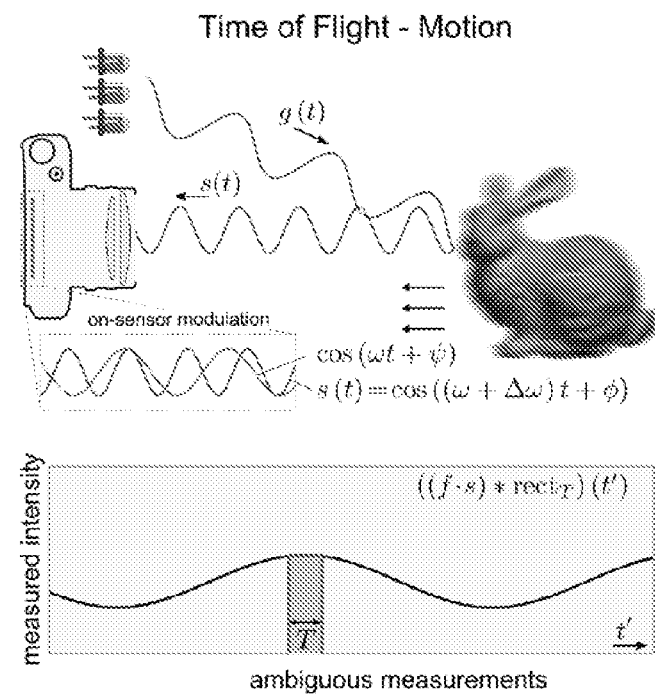
FIG. 2B depicts an embodiment of depth imaging of the present disclosure for a scene in motion.

Note that this equation is now dependent on the time of measurement. Unfortunately, the introduced temporal intensity variation makes it more difficult to estimate phase and therefore also depth. In audio signal processing, this time-dependent low-frequency artifact is known as a beating pattern. This is illustrated in FIGS. 2A and 2B. For static scenes, measurements are unambiguous: different phase shifts result in unique intensity measurements (FIG. 2A). For dynamic scenes, the Doppler shift results in a low-frequency beating pattern that makes measured intensities ambiguous, and hence prevents accurate depth estimation (FIG. 2B).

The phase estimate from Equation 6 is then distorted as $$\phi_{est}[t'] = \tan^{-1}\left(\frac{i_{\pi/2}[t']}{i_0[t']}\right) + \Delta\omega t', \quad (10)$$

where the distortion Δωe linearly depends on the (unknown) object velocity. Note that, in practice, the estimated phase for moving objects corresponds to its average throughout the exposure.

To summarize, in the homodyne setup, where the frequency of the light source and the frequency of the camera reference signal are identical, the Doppler shift introduced by moving objects results in mismatched frequencies on the image sensor. This situation is closely related to hetereodyne Time-of-Flight imaging (e.g., [Dorrington et al. 2007]), which generalizes the conventional homodyne capture mode to arbitrary combinations of illumination and sensor modulation frequencies. For static scenes, the heterodyne imaging mode can be beneficial in certain situations, but a major limitation of heterodyne ToF is that multiple (>2) measurements have to be captured to reliably estimate phase and depth. Since the beating pattern is usually of very low frequency (for example, in the order of a few Hz at most velocities typical to indoor environments), a significant amount of time needs to pass between the two measurements for accurate phase estimation. For moving objects, the necessity to capture multiple images may place constraints on the velocity.

To facilitate reliable velocity estimation, in an embodiment a new computational Time-of-Flight imaging methodology is derived in the following section. Similar to orthogonal frequency-division multiplexing (OFDM), D-ToF uses illumination and on-sensor modulation frequencies that are orthogonal within the exposure time of the camera. Using these frequencies, a method is provided that allows per-pixel radial object velocity estimation.

As illustrated in FIG. 2B, the low-frequency beating pattern created by the Doppler effect makes it difficult or impossible to capture reliable Doppler frequency and phase information. Consider the following example: a road cyclist frequency of 50 MHz (i.e. $\omega_g = 50 \cdot 10^5 \cdot 2\pi/s$), the observed Doppler shift is only $$\Delta\omega = \frac{v}{c}\omega_g = \frac{10\frac{m}{s}}{300\cdot 10^6 \frac{m}{s}} \cdot 50\cdot 10^6 \frac{2\pi}{s} \approx 1.67 \frac{2\pi}{s} \quad (11)$$

A frequency shift of only 1:67 Hz may seem small enough to be safely ignored. However, we show in the following that even such a minute change contains valuable information that can be used for velocity estimation.

Velocity Imaging Via Orthogonal Frequencies

Figure 3A:
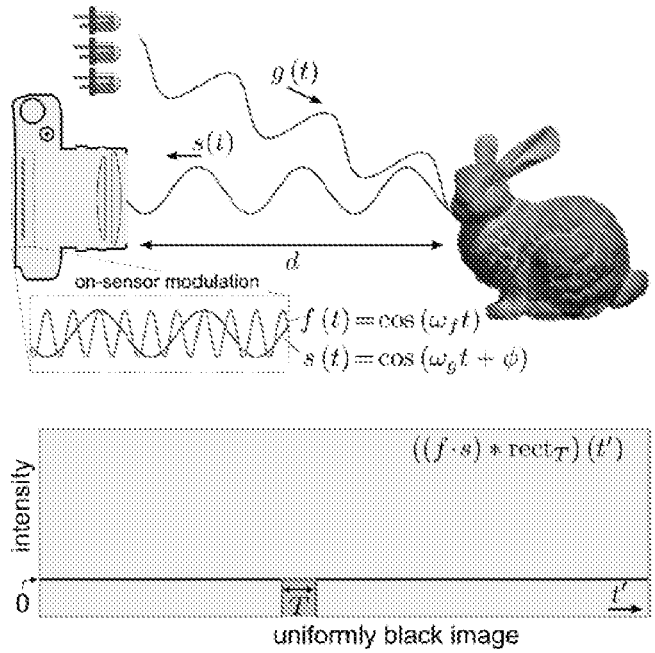
FIG. 3A depicts an embodiment of velocity imaging of the present disclosure for a static scene.
Figure 3B:
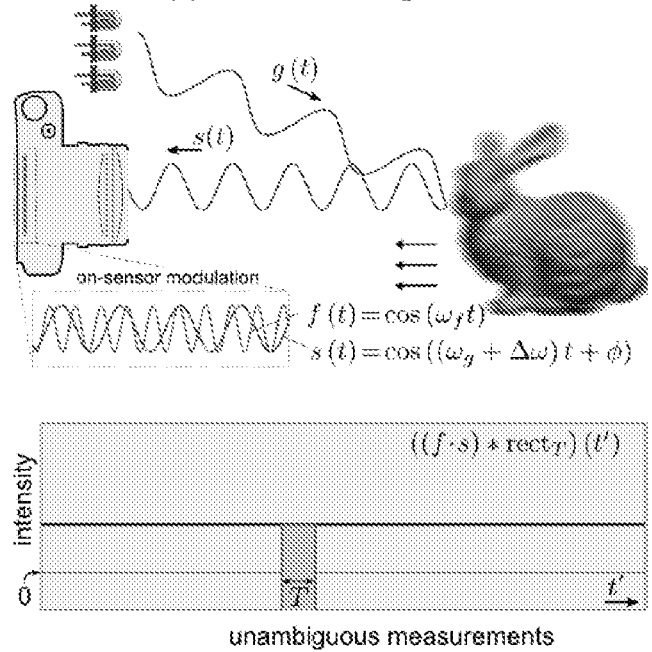
FIG. 3B depicts an embodiment of velocity imaging of the present disclosure for a scene in motion.

Inspired by multiplexing techniques in digital communication, an unconventional way is devised to extract velocity information from the small Doppler shift observed by a ToF camera. In an embodiment, the camera system can be interpreted as a communication channel, and the illumination considered as a carrier signal. The carrier can be optically modified by moving objects—a change can be observed in carrier amplitude, phase, and frequency. The secondary modulation in the sensor followed by a low-pass filter of the exposure time can correspond to the demodulation process in communication. Conventional communication channels use orthogonal frequencies; any inter-carrier interference (which could be caused by a frequency drift) is a polluting signal. For Doppler ToF, the frequencies in the receiver and transmitter can be designed to be orthogonal, such that the (usually polluting) inter-carrier interference carries the desired velocity information. An example is shown in FIGS. 3A and 3B.

For the application of direct velocity imaging, the measured signal for a stationary object can be zero (or a constant intensity offset). This can be achieved by operating the ToF camera in heterodyne mode with two orthogonal frequencies $\omega_g$ and $\omega_f$. While any two sine waves with frequencies $\omega_g \neq \omega_f$ will be orthogonal for sufficiently long integration times, this is not the case for finite integrals (exposures) in the presence of low frequency beating patterns. Designing both frequencies to be orthogonal is done by setting $$\omega_g = k\frac{2\pi}{T} \text{ and } \omega_f = l\frac{2\pi}{T} \text{ with } k,l \in \mathbb{N}, k \neq l, \quad (12)$$

i.e. having the exposure time T be an integer multiple of the period of both signals. It is then easy to show from Equation 3 that $$i_\psi = \int_0^T i_\psi(t)dt = 0 \quad (13)$$

for stationary objects ($\omega_s = \omega_g$). In practice, we set l=k+1, and we set k depending on T and the desired frequency $\omega_g$.

Given these two orthogonal frequencies the inter-carrier interference can be used to extract valuable information about the Doppler shift. This can be achieved by computing the ratio of a heterodyne measurement and a homodyne measurement. Using only the low frequency terms from Equation 3, this ratio can be expressed, without loss of generality and assuming an exposure interval of [0 . . . 7] as:

$$r = \frac{\int_0^T \cos(\omega_f t + \psi)\cdot(s_1\cos((\omega_g+\Delta\omega)t+\phi)+s_0)dt}{\int_0^T \cos(\omega_g t + \psi)\cdot(s_1\cos((\omega_g+\Delta\omega)t+\phi)+s_0)dt} \quad (14)$$

$$\approx \frac{\int_0^T \frac{s_1}{2}\cos((\omega_f-\omega_g-\Delta\omega)t+\psi-\phi)dt}{\int_0^T \frac{s_1}{2}\cos(-\Delta\omega t+\psi-\phi)dt}$$

$$= \frac{\frac{s_1}{2(\omega_f-\omega_g-\Delta\omega)}[\sin((\omega_f-\omega_g)t-\Delta\omega t+\psi-\phi)]_0^T}{\frac{s_1}{-2\Delta\omega}[-\Delta\omega t+\psi-\phi]_0^T}$$

$$= \frac{-\Delta\omega}{\omega_f-\omega_g-\Delta\omega} \cdot \underbrace{\frac{\sin((\omega_f-\omega_g)T-\Delta\omega T+\psi-\phi)-\sin(\psi-\phi)}{\sin(-\Delta\omega T+\psi-\phi)-\sin(\psi-\phi)}}_{=1}$$

$$\approx \frac{-\Delta\omega}{\omega_f-\omega_g}$$

since $(\omega_f - \omega_g)T = (k-1)2\pi$, and $\Delta\omega \ll \omega_f - \omega_g$.

Figures 4A, 4B:
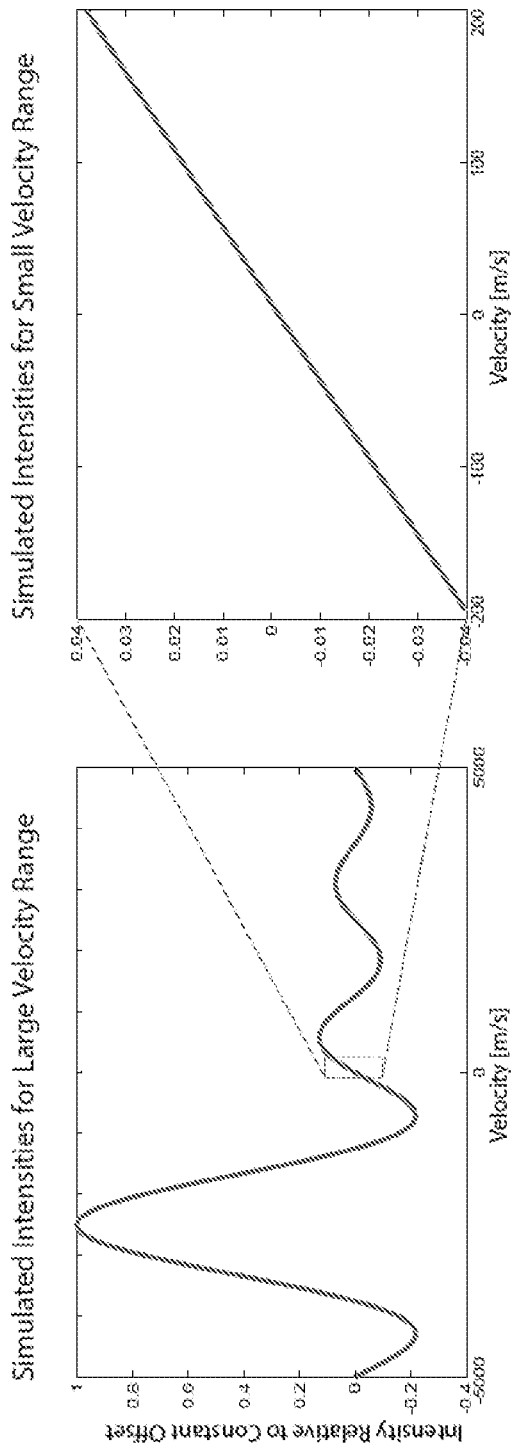
FIG. 4A depicts examples of simulated intensities for a large range of different velocities.
FIG. 4B depicts examples of simulated intensities for a small range of different velocities.
Figures 4C, 4D:
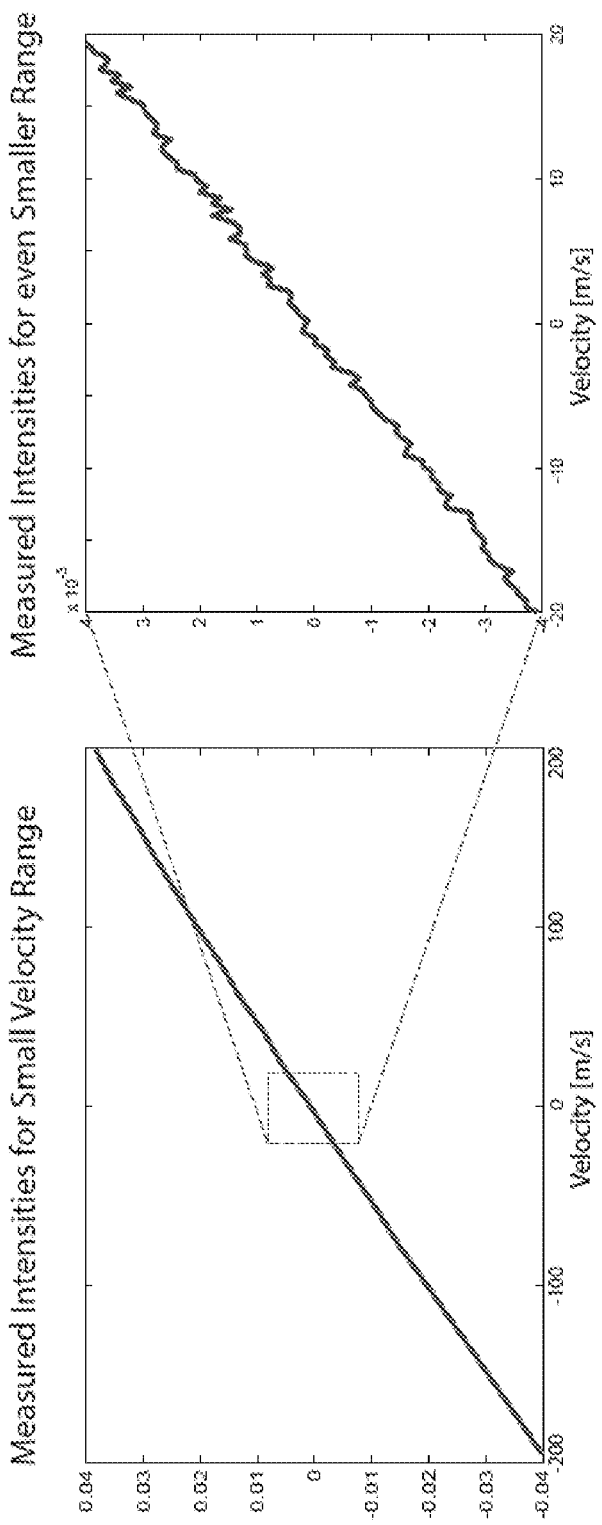
FIG. 4C depicts examples of measured intensities for a small range of different velocities.
FIG. 4D depicts examples of measured intensities for a smaller range of different velocities than FIG. 4C.

FIGS. 4A-D shows the model derived here. On the left side, the full model is seen without any approximations (i.e. without neglecting high frequency components in Eq. 14). Although the image formation is nonlinear, for a relatively large range of metric velocities (FIG. 4A) it is very well approximated (FIG. 4B, center left) by our linear model (Eq. 14). The model is verified experimentally by using the camera prototype (FIGS. 4C and 4D, right). These particular measurements were captured with a static scene, and acquired with a modulation frequency of $\omega_f = 60$ Hz and an illumination frequency of $\omega_g$=60 MHz+1 KHz. Thus, the Doppler shift for an object moving at a specific velocity was programmed into the illumination frequency for this particular experiment. With known, orthogonal illumination and modulation frequencies $\omega_g, \omega_f$ it is therefore straightforward to compute the Doppler $\Delta\omega$ from Equation 14. The ratio image r can be interpreted as a direct measurement of the instantaneous per-pixel radial velocity.

This approach can still require two measurements: one heterodyne image and one homodyne image. There are several possible solutions for either acquiring these truly simultaneously, or they can be acquired in quick succession. For instantaneous measurements, two synchronized ToF sensors can be mounted in a co-axial setup; one of the sensors is modulated with the same frequency as the light source ($\omega_g$), while the other uses a slightly different frequency $\omega_f \neq \omega_g$. This approach is similar in spirit to multi-sensor HDR imaging [Tocci et al. 2011].

Instead of using two distinct sensors, it is also possible to multiplex pixels with two different modulation frequencies onto the same image sensor, either in alternating scanlines or in a checkerboard pattern. Again, this concept is similar in spirit to techniques that have been proposed for HDR cameras [Yasuma et al. 2010; Gu et al. 2010].

A third possibility is to rapidly alternate between two modulation frequencies using a single ToF camera. In this case, the measurements are not truly instantaneous, and alignment problems can occur for very fast motions. However, the two measurements can be taken immediately after each other, as fast as the camera hardware allows, e.g. at 30 or 60 Hz. We follow this approach as it only requires a single ToF camera. However, we can also use a setup with multiple synchronized ToF cameras. Note that, similar to heterodyne depth estimation [Dorrington et al. 2007], the Doppler shift can also be estimated directly from the low-frequency beating pattern, but at the cost of requiring multiple measurements that are much more widely spaced in time (hence not suitable for velocity estimation).

Finally, the model from Equation 14 may only hold for sinusoidal modulation functions. If other periodic signals are being used, additional harmonic frequency components are introduced, which can distort the measurements for both stationary and moving targets. However, these offsets are systematic and can be calibrated for a specific ToF camera/lights source combination (see Implementation Section herein).

Simultaneous Range and Velocity

In many applications it may be useful to obtain both velocity and range measurements at the same time. As in standard ToF imaging, this can be achieved by capturing a second homodyne measurement with the phase offset by $\pi/2$. Simultaneous range and velocity imaging therefore may involve a total of three measurements: a heterodyne image with $\psi=0$, a homodyne image with $\psi=0$, and a homodyne image with $\psi=\pi/2$.

As discussed in the Time-of-Flight Imaging Section above, motion introduces a velocity-dependent distortion $\Delta\omega e$ of the depth measurement (Eq. 10). However, since the distortion linearly depends on the Doppler shift $\Delta\omega$, which is known from the velocity estimation step (Eq. 14), we can now correctly estimate the phase delay (and hence the depth) from Equation 10. This may only involve a single additional calibration step to obtain $\Delta\omega t'$ for a specific velocity, which corresponds to estimating the time offset t' between the start of the exposure time and the reference time for signal generation in the camera and light source.

As mentioned, simultaneous velocity and range imaging may involve three distinct measurements. The illumination signal may be the same for all three measurements. Only the reference signal for the camera may change. As in the case of velocity-only imaging, this means that all three measurements can potentially be acquired at the same time using either multiple sensors with a shared optical axis, or a sensor design with interleaved pixels. If neither option is available, rapid frame-sequential imaging is also possible.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for.

EXAMPLES

Implementation

Figure 17:
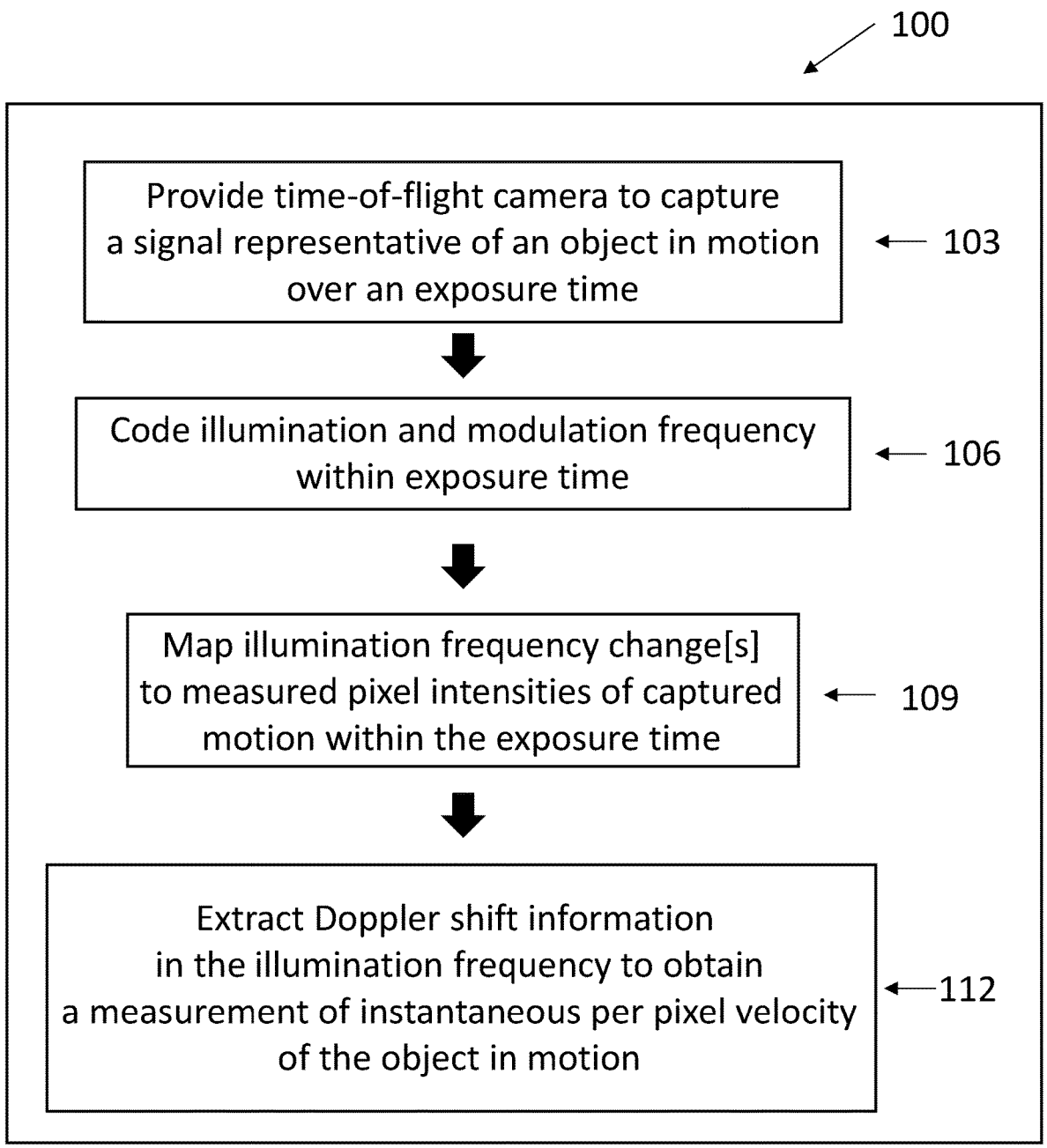
FIG. 17 is a flowchart depicting an embodiment of a method of the present disclosure.

Method. A generic embodiment of a method 100 according to the present disclosure is shown in FIG. 17. Briefly, first a Time-of-Flight camera is provided 103. The camera can be used to capture a signal representative of an object in motion over an exposure time. Second, illumination and modulation frequency within the exposure time for the captured motion are coded 106. Third, illumination frequency changes are mapped 109 to measured pixel intensities of the captured motion with the exposure time. Last, Doppler shift information in the illumination frequency is extracted 112 to obtain a measurement of instantaneous per pixel velocity of the object in motion.

Figure 19:
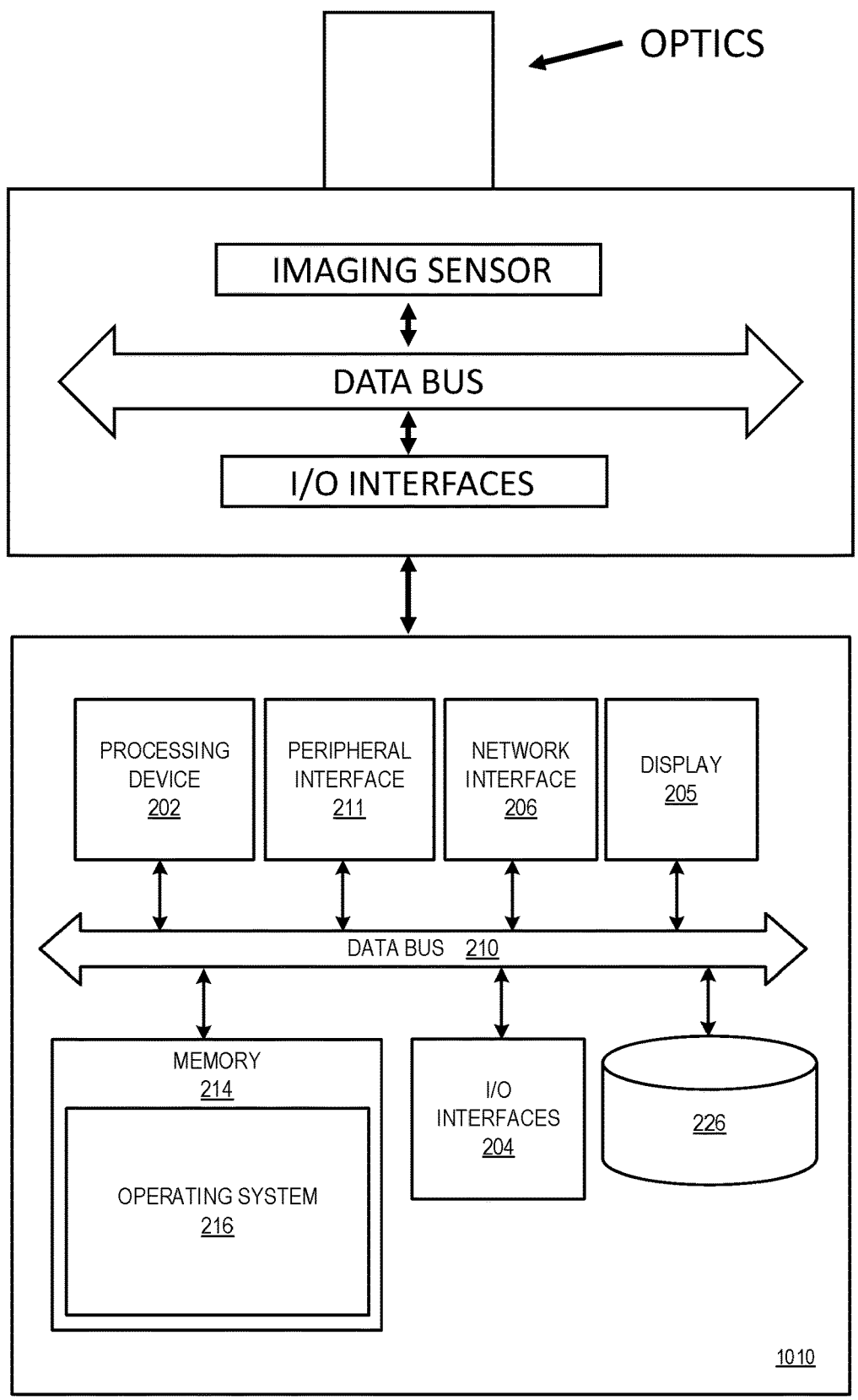
FIG. 19 shows an embodiment of a camera system according to the present disclosure.

Hardware. Hardware characteristics of the imaging system or Time-of-Flight camera as described herein can include an illumination unit, optics, an image sensor, driver electronics, an interface, and computational ability. The hardware of embodiments of imaging systems as described herein can be seen in FIG. 1A, FIG. 19, FIG. 20, and FIG. 21. An embodiment of a generic camera system is shown in FIG. 19. The embodiment shown in FIG. 19 can be tailored to different applications by changing the characteristics of the imaging sensor. In an embodiment, the imaging sensor of FIG. 19 can be a conventional RGB imaging sensor and therefore FIG. 19 can be an RGB camera. In another embodiment, the imaging sensor of FIG. 19 can be a sensor suitable for a Time-of-Flight camera, such as the PMD Technologies PhotonICs 19k-S3 imaging sensor, and FIG. 19 can be a Time-of-Flight camera.

Figure 1A:
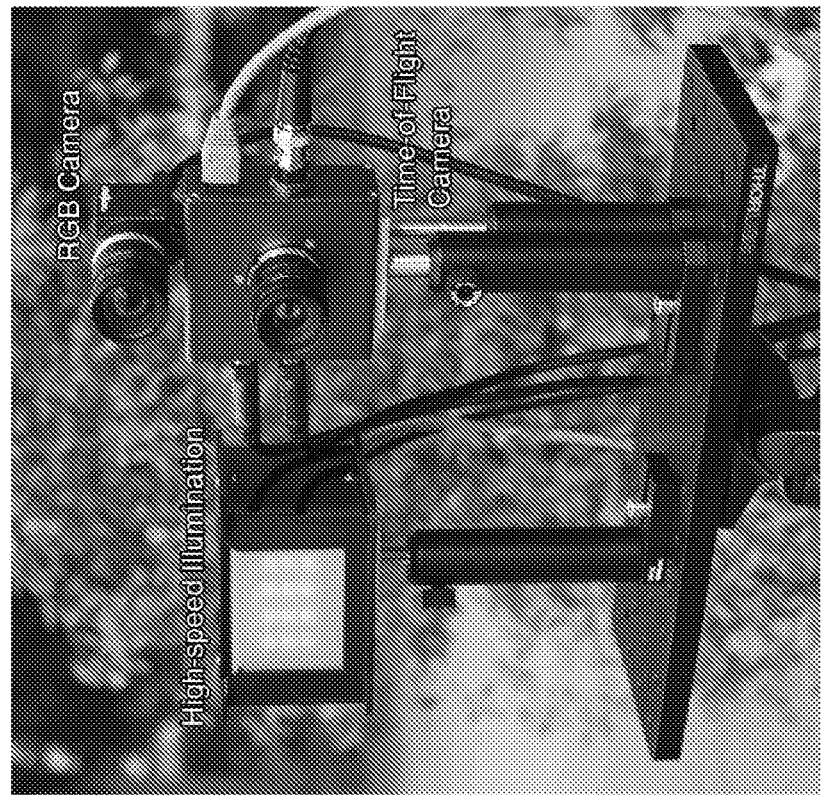
FIG. 1A depicts an embodiment of an imaging system of the present disclosure that allows for metric radial velocity information to be captured. Depicted in the embodiment are a high-speed illumination source, RGB camera, and Time-of-Flight (ToF) camera.
Figure 1E:
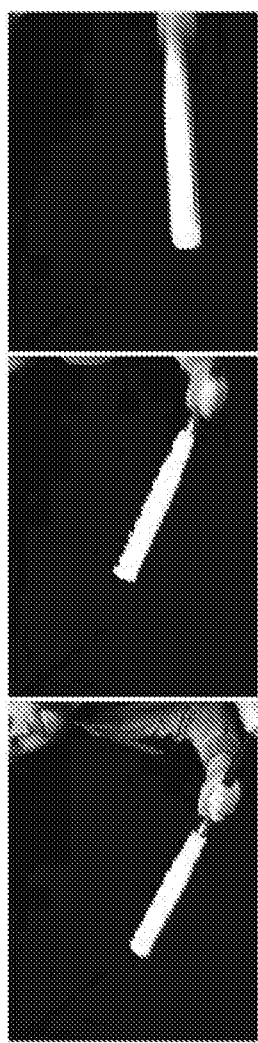
FIG. 1E depicts images that can captured by an imaging system of the present disclosure of an example of an object in motion.
Figure 1F:
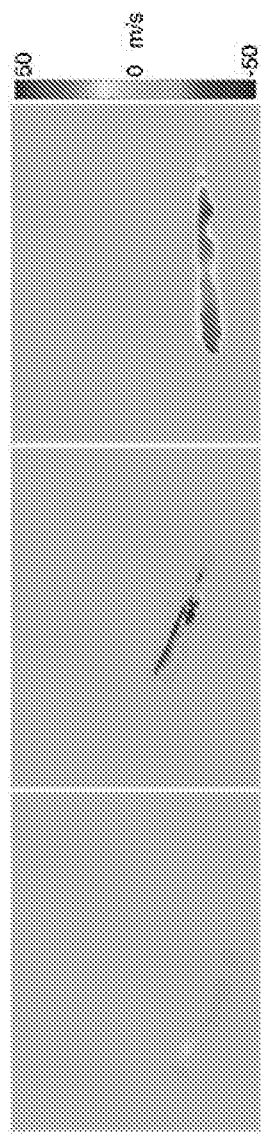
FIG. 1F depicts velocity data that can captured by an imaging system of the present disclosure of an example of an object in motion.
Figure 1G:
FIG. 1G depicts depth data that can captured by an imaging system of the present disclosure of an example of an object in motion.

For all physical experiments, an experimental Time-of-Flight camera system was used that comprises a custom RF modulated light source and a demodulation camera based on the PMD Technologies PhotonICs 19k-S3 imaging sensor (see FIG. 1A). The system allows for metric radial velocity information to be captured instantaneously for each pixel (center row). The illumination and modulation frequencies of a Time-of-Flight camera (left) to be orthogonal within its exposure time. The Doppler effect of objects in motion is then detected as a frequency shift of the illumination, which results in a direct mapping from object velocity to recorded pixel intensity. By capturing a few coded Time-of-Flight measurements and adding a conventional RGB camera to the setup, it can be demonstrated in FIGS. 1B-G that color, velocity, and depth information of a scene can be recorded simultaneously. The results of FIG. 1B and FIG. 1G show several frames of two video sequences. For each example in FIG. 1B and FIG. 1G, the left-most frame shows a static object (velocity map is constant), which is then moved towards (positive radial velocity) or away (negative velocity) from the camera.

An illumination unit can be a light source which can be an array of 650 nm laser diodes driven by iC-Haus constant current driver chips, type ic-HG. A PMD CamBoard nano development kit was used with a clear glass sensor that has the near IR bandpass filter removed, in combination with an external 2-channel signal generator to modulate the sensor and synchronize the light source. The setup is similar to commercially-available Time-of-Flight cameras and the proposed algorithms can be easily implemented on those. Unfortunately, developers usually do not have access to illumination and modulation frequencies of these devices, requiring the construction of custom research prototype cameras. The maximum illumination and demodulation frequency of our prototype is 150 MHz, but we run all of the presented results with 30 MHz. The modulation signals are nearly sinusoidal, but contain multiple low-amplitude harmonic components. To avoid systematic errors in depth and velocity estimation, these components can be calibrated as described in the following.

Figure 18:
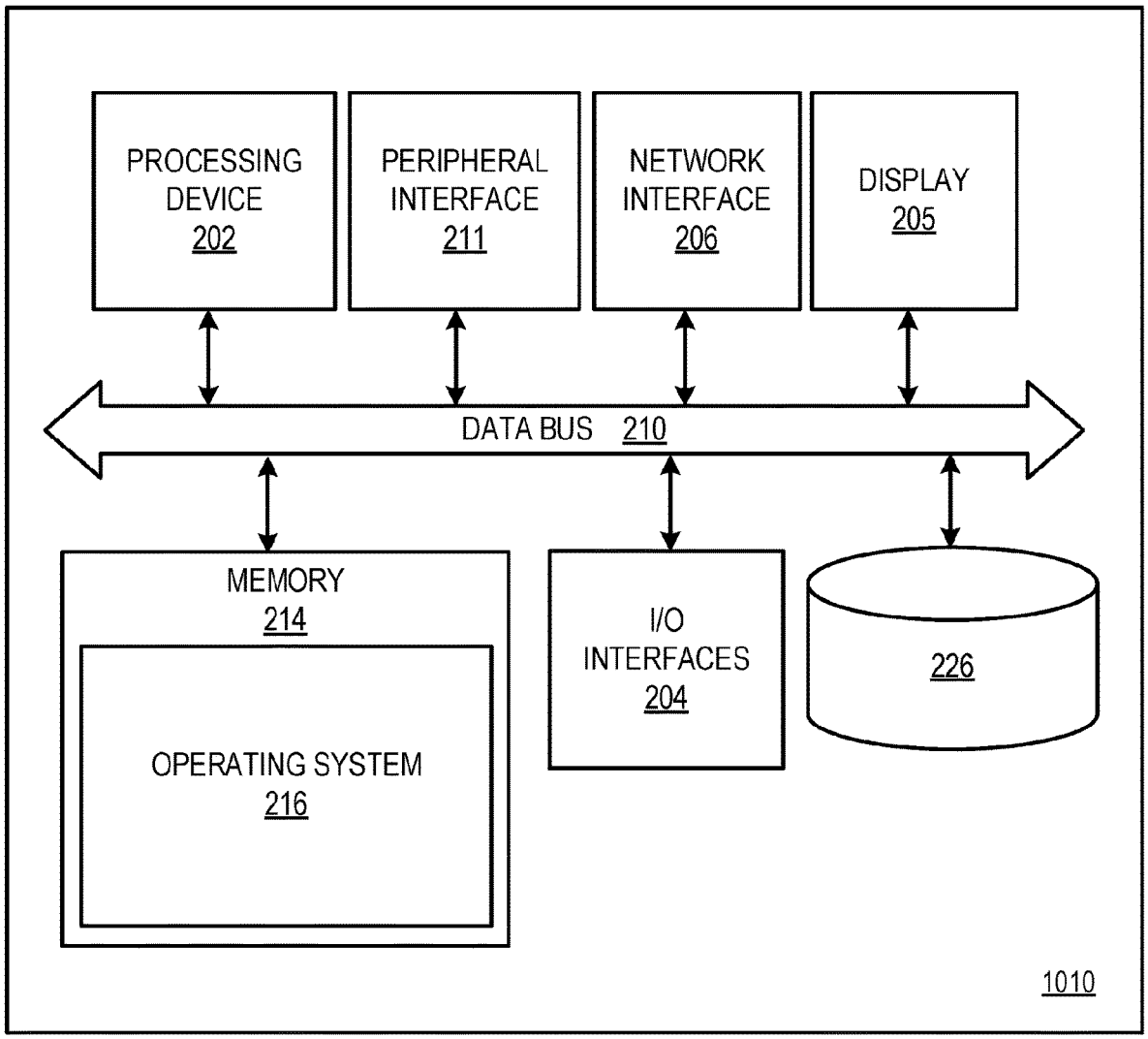
FIG. 18 depicts an embodiment of an apparatus that can be used in the systems and methods of the present disclosure.

FIG. 18, depicts an apparatus 1010 in which the Doppler Time-of-Flight imaging described herein may be implemented. The apparatus 1010 can contain the driver electronics and computational ability for the imaging system or Time-of-Flight camera as described herein. The apparatus 1010 may be embodied in any one of a wide variety of wired and/or wireless computing devices, multiprocessor computing device, and so forth. As shown in FIG. 18, the apparatus 1010 comprises memory 214, a processing device 202, a number of input/output interfaces 204, a network interface 206, a display 205, a peripheral interface 211, and mass storage 226, wherein each of these devices are connected across a local data bus 210. The apparatus 1010 may be coupled to one or more peripheral measurement devices (not shown) connected to the apparatus 1010 via the peripheral interface 211.

The processing device 202 may include any custom made or commercially available processor, a central processing unit (CPU) or an auxiliary processor among several processors associated with the apparatus 1010, a semiconductor based microprocessor (in the form of a microchip), a macroprocessor, one or more application specific integrated circuits (ASICs), a plurality of suitably configured digital logic gates, and other well-known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may be configured to perform some or all of the Doppler Time-of-Flight imaging techniques described herein. In accordance with such embodiments, the application specific software is stored in memory 214 and executed by the processing device 202. One of ordinary skill in the art will appreciate that the memory 214 can, and typically will, comprise other components which have been omitted for purposes of brevity.

Input/output interfaces 204 provide any number of interfaces for the input and output of data. For example, where the apparatus 1010 comprises a personal computer, these components may interface with one or more user input devices 204. The display 205 may comprise a computer monitor, a plasma screen for a PC, a liquid crystal display (LCD) on a hand held device, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

With further reference to FIG. 18, network interface device 206 comprises various components used to transmit and/or receive data over a network environment. For example, the network interface 206 may include a device that can communicate with both inputs and outputs, for instance, a modulator/demodulator (e.g., a modem), wireless (e.g., radio frequency (RF)) transceiver, a telephonic interface, a bridge, a router, network card, etc.). The apparatus 1010 may communicate with one or more computing devices via the network interface 206 over a network. The apparatus 1010 may further comprise mass storage 226. The peripheral 211 interface supports various interfaces including, but not limited to IEEE-1394 High Performance Serial Bus (Firewire), USB, a serial connection, and a parallel connection.

Figure 20:
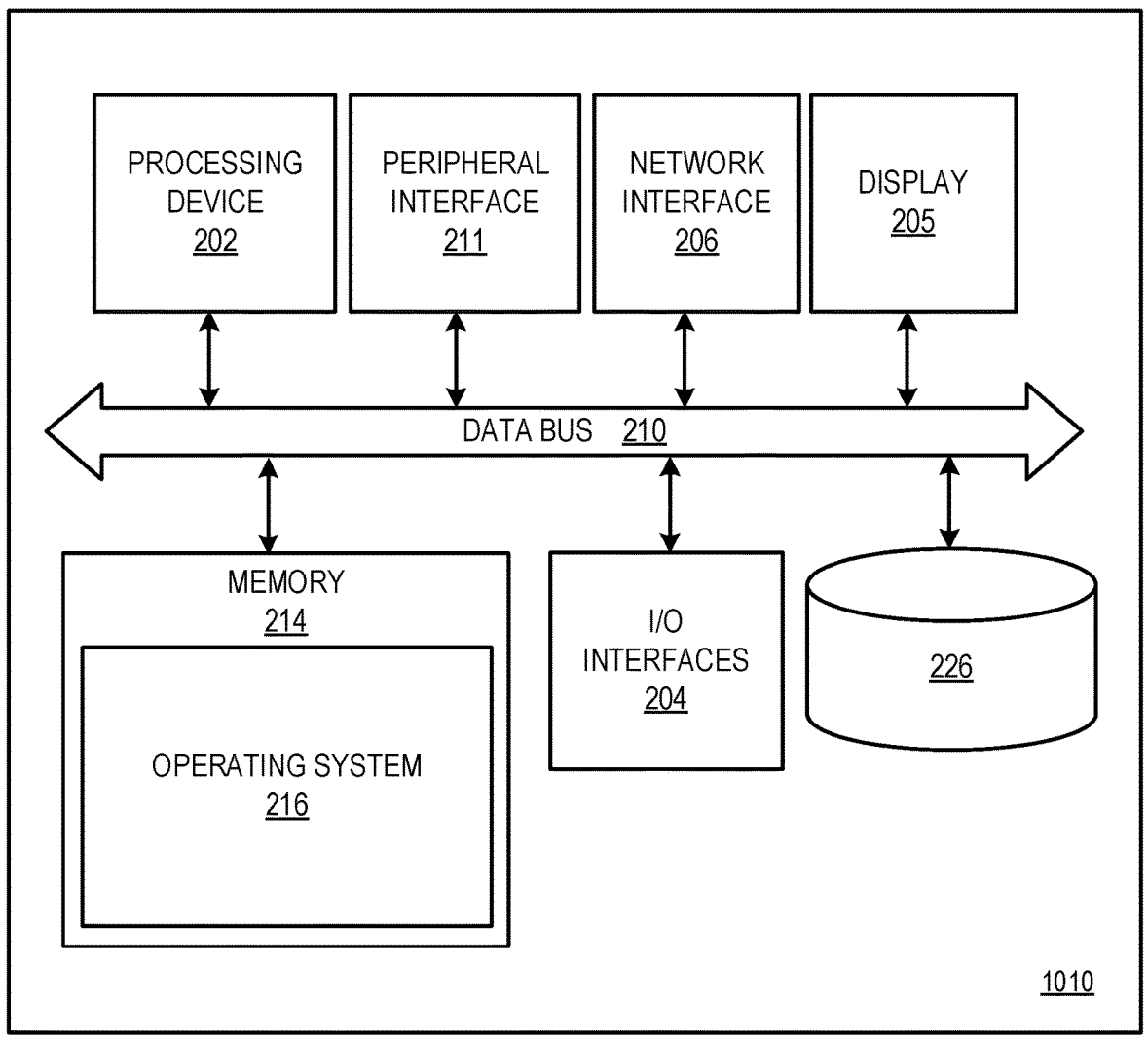
FIG. 20 shows an embodiment of a camera system according to the present disclosure.
Figure 20:
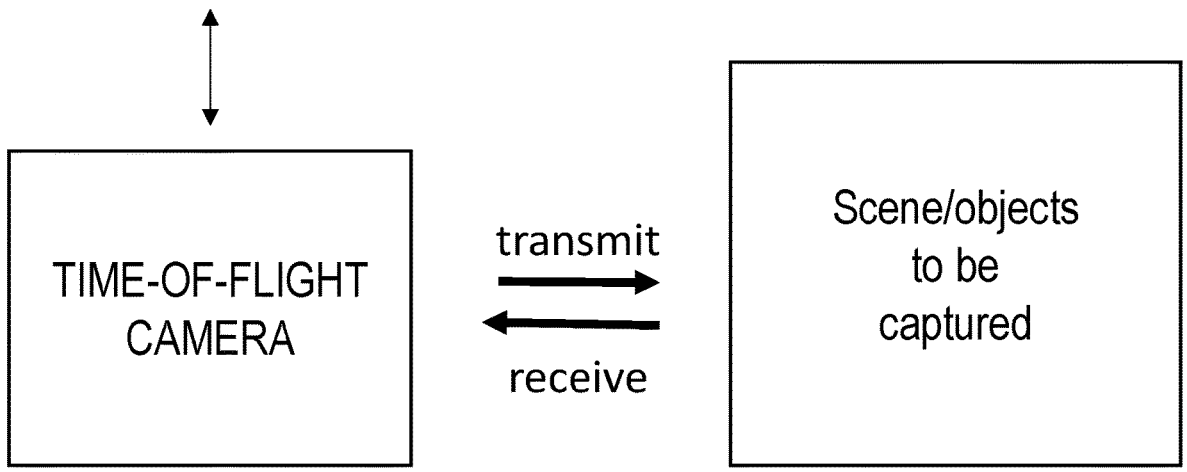
Figure 21:
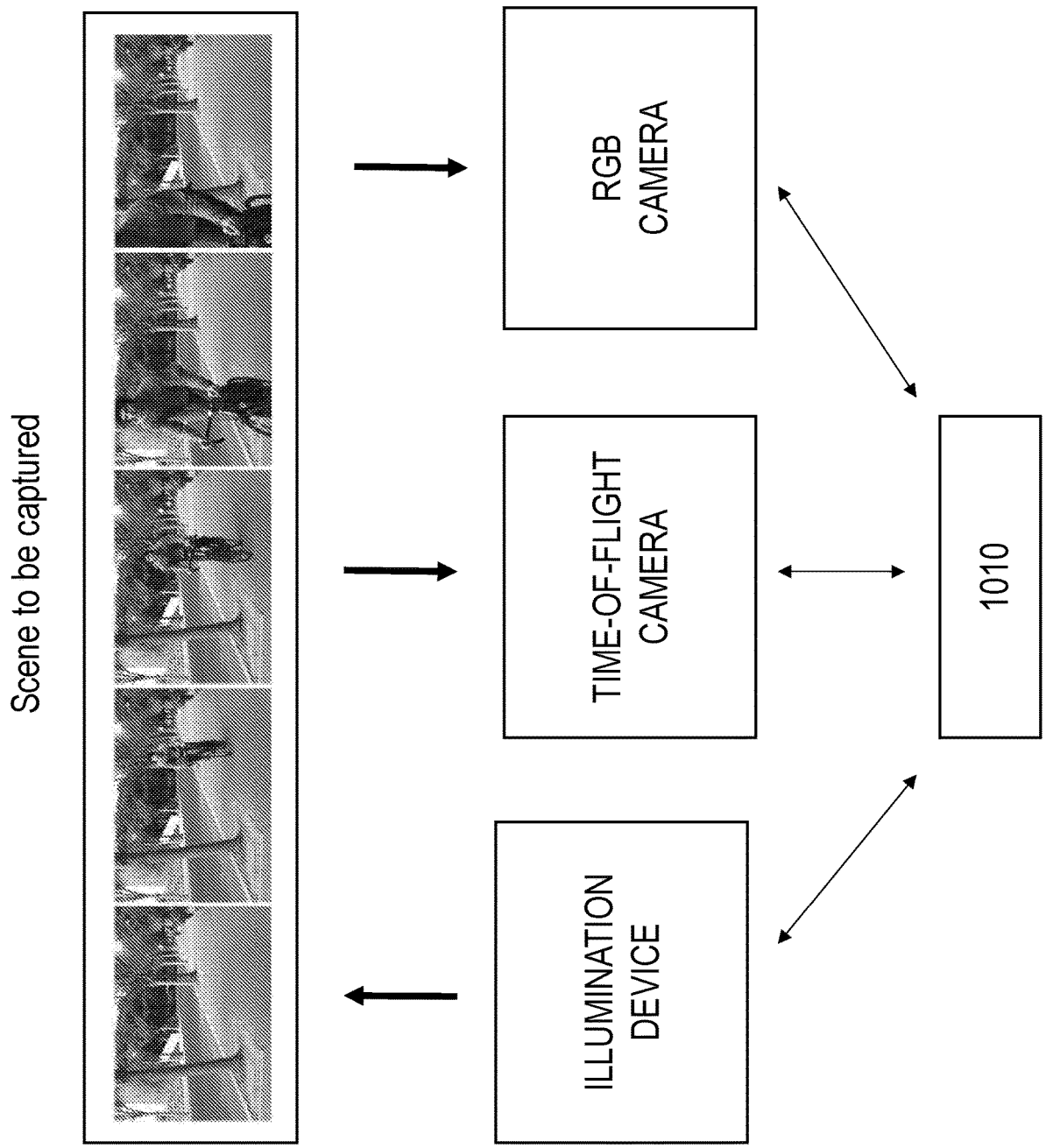
FIG. 21 shows an embodiment of a camera system according to the present disclosure.

The apparatus 1010 shown in FIG. 18 can be electronically coupled to and in communication with a Time-of-Flight camera as shown in FIGS. 19, 20, and 21. Data can be passed back and forth between the apparatus 1010 and the Time-of-Flight camera, wired (USB, Firewire, thunderbolt, SDI, Ethernet, for example) or wirelessly (Bluetooth or WiFi, for example). Alternatively, the apparatus 1010 can be a part of the Time-of-Flight camera. An imaging system as described herein can be comprised of a Time-of-Flight camera or a Time-of-Flight camera in communication with an apparatus such as the apparatus 1010. An imaging system as described herein can also include any conventional RGB camera and/or an illumination source. An RGB camera and/or illumination source can also electronically coupled to and in communication with an apparatus 1010 along with a Time-of-Flight camera in an embodiment of an imaging system.

An imaging system as described herein can be configured to record successive frames of a scene. The scene can contain one or more objects in motion. Successive frames of a scene can be still images or from a video constructed of continuous successive frames. Scenes can be captured by the Time-of-Flight camera or Time-of-Flight camera in conjunction with an RGB camera. Data from the camera[s] can be sent and processed by an apparatus such as the apparatus 1010, and the apparatus 1010 can compute, process, and/or reconstruct data captured by the camera[s]. Data captured by the camera[s] can be one or more signals representative of one or more objects in motion. The one or more signals can contain information relating to RGB images, velocity, and/or depth that are representative of a scene. Embodiments of the present imaging systems are shown in FIG. 1A, FIG. 19, and FIG. 21.

Figure 5C:
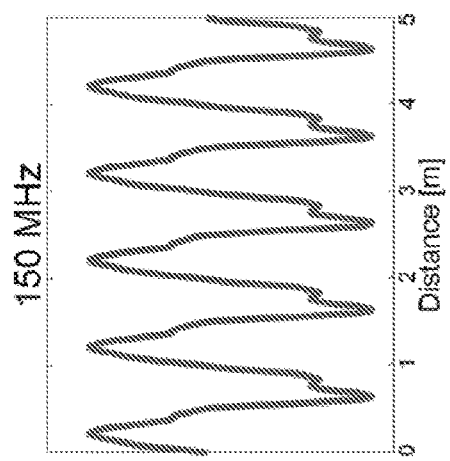
FIG. 5C depicts depth-dependent offset introduce by higher-order frequency components for a modulation frequency of 150 MHz.
Figure 5B:
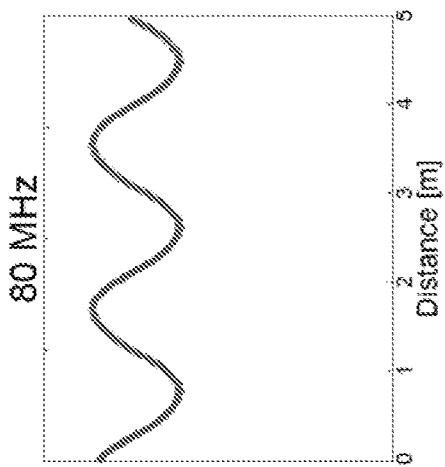
FIG. 5B depicts depth-dependent offset introduce by higher-order frequency components for a modulation frequency of 80 MHz.
Figure 5A:
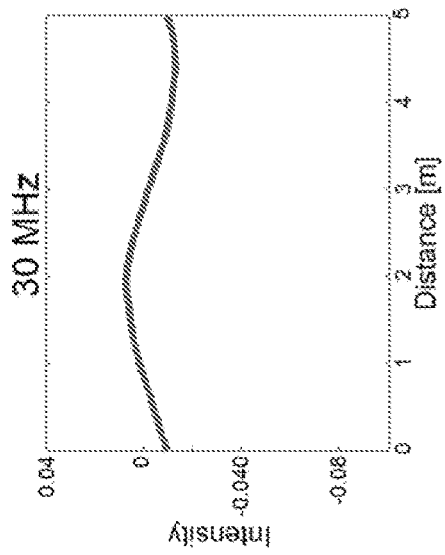
FIG. 5A depicts depth-dependent offset introduce by higher-order frequency components for a modulation frequency of 30 MHz.

Correcting for Higher-order Harmonics. The present camera prototype has the drawback that the periodic modulation functions are not perfectly sinusoidal, although they are very close. In addition to the fundamental frequency, this introduces higher-order harmonic components to the modulation signal. Unfortunately, the higher-order components are generally not orthogonal, thus they can cause a phase-dependent offset. This offset can be calibrated for different modulation frequencies and phase shifts using a static target. The depth-dependent offsets can be plotted for different modulation frequencies in FIGS. 5A-C. These offsets can be calibrated in a one-time offline process and then used to correct the raw phase measurement on a per-pixel on basis.

This offset can be calibrated in an offline process and raw phase measurements can be corrected digitally using a lookup table. Note that for relatively low modulation frequencies, such as 30 MHz, we find a fairly large depth range (around 1 m) to be almost independent of this offset. In practice, it is therefore relatively easy to remove the higher-order frequency components.

Calibrating Phase Response. As is standard practice in Time-of-Flight cameras, the physical intensity response can be calibrated for different phase shifts $\phi$ in an offline calibration. Following [Lindner and Kolb 2006], the physical intensity response can be measured for a phase sweep of the illumination frequency and fit a fifth-order polynomial to the measurements. This can be used as a lookup table for converting phase to depth rather than solving Equation 6 directly. With the present prototype, a notable zeroth-order component of the fitted polynomial can be measured, corresponding to fixed pattern phase noise. This is easily corrected.

Figure 6A:
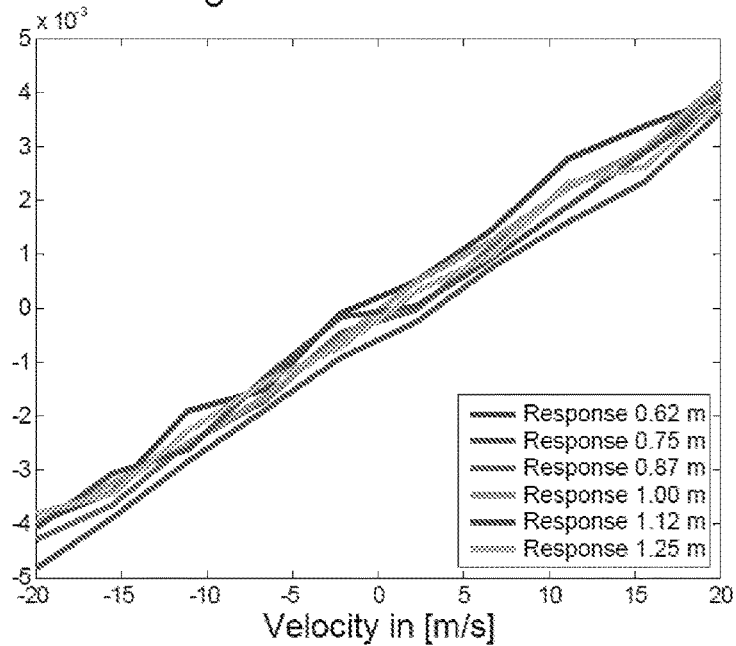
FIG. 6A depicts an experimental verification of the imaging system for varying object velocities and depths (left)
Figure 6B:
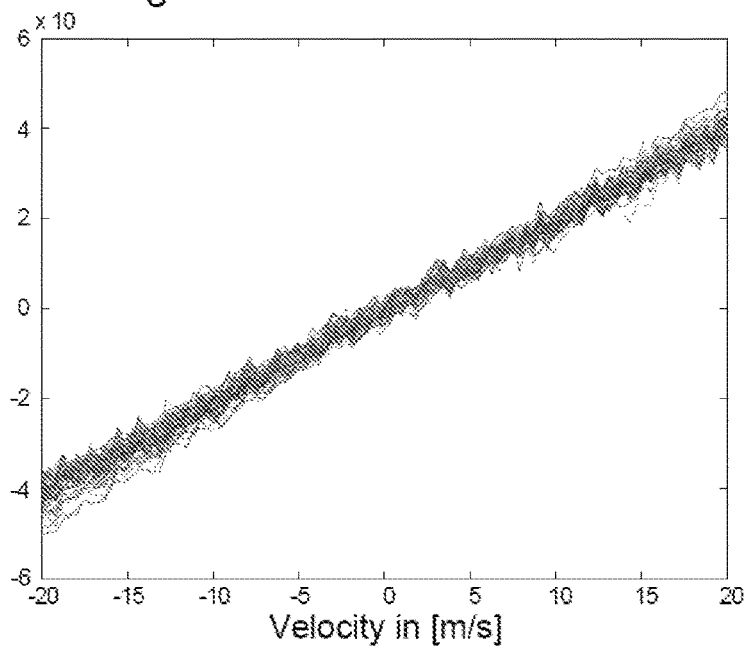
FIG. 6B depicts measured intensities for a range of different pixel locations and velocity-dependent behavior for a range of different pixel locations on the sensor (right).

Verification of Calibration Procedure. The two calibration procedures described above are performed for all spatial locations on the sensor independently. To verify the calibration routines, a static target was imaged and a frequency and phase sweep applied to the modulation function, simulating objects at different velocities and depths. The results shown in FIGS. 4C-D demonstrate that the measured intensities for a constant phase but varying Doppler shift follow the model derived in the Doppler-based Velocity Imaging Section herein. Other than a small amount of noise, which is mostly due to a relatively low signal-to-noise ratio, the curve is linear and behaves as predicted. In FIG. 6A, measurements for a range of different phase offsets in the modulation frequency was verified experimentally. This simulates objects at various depths, as indicated in the legend. Finally, the velocity-dependent behavior was tested for a range of different pixels over the sensor location and show results in FIG. 6B. All of this data is captured using a large planar target perpendicular to the camera and sweeping the illumination frequency (to simulate different Doppler shifts) and phase (to simulate different object distances). The remaining variance over pixel locations and phases is minimal.

Figure 7A:
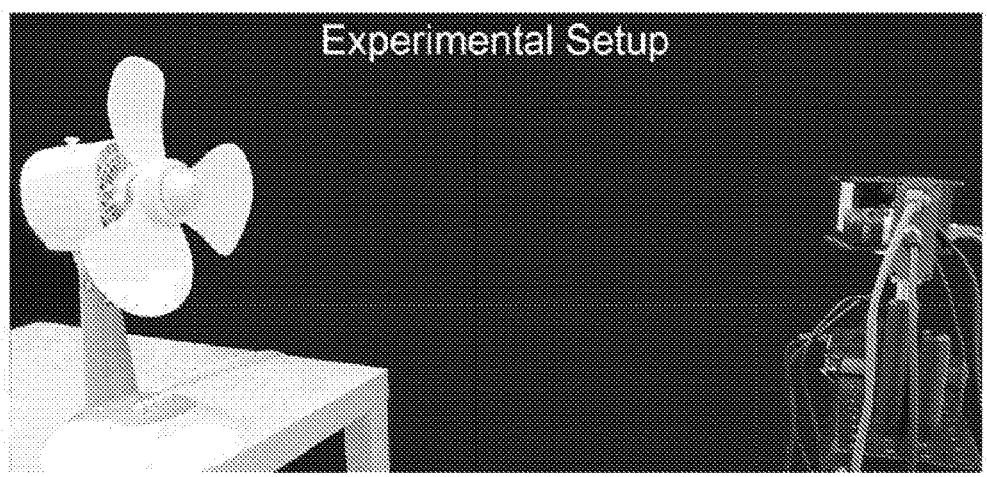
FIG. 7A depicts an embodiment of experimental setup used for an experimental validation of velocity estimation using a fan with adjustable rotation speed (three settings).
Figure 7B:
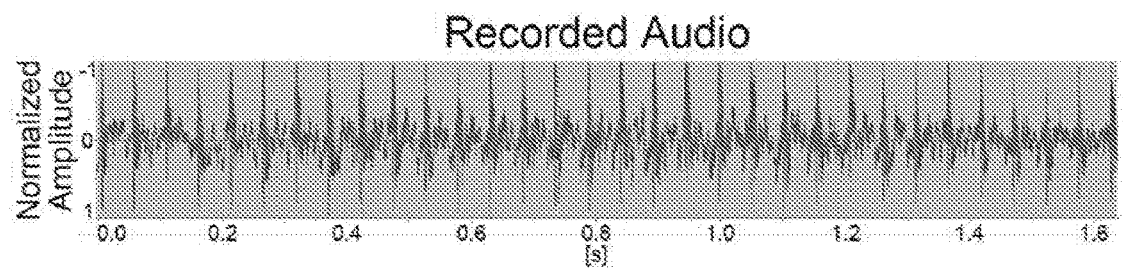
FIG. 7B audio recordings analyzed to generate ground truth velocity data of the rotating blades of the setup in FIG. 7A
Figure 7C:
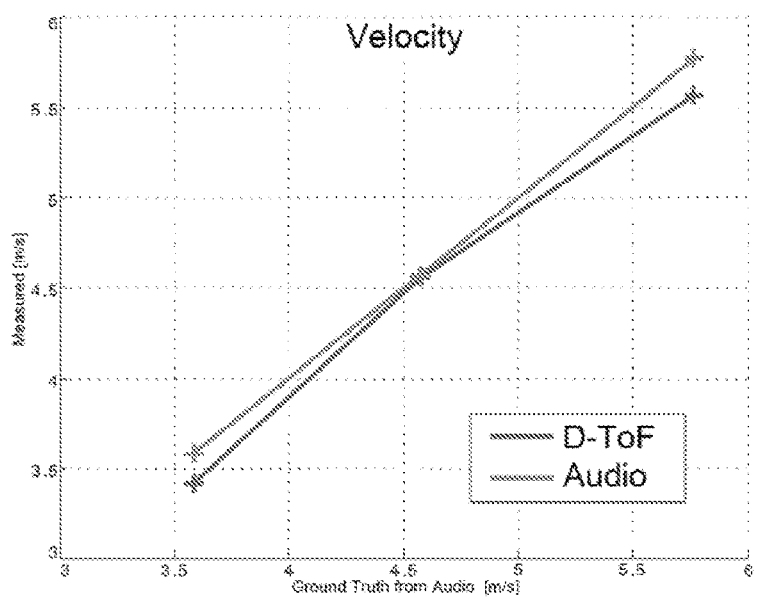
FIG. 7C shows the velocity measured by D-ToF compared to the ground truth for a varying rotation speed.

FIGS. 7A-E show another experiment that was used to verify the accuracy of our D-ToF camera system. The experiment setup is shown in FIG. 7A. In this example, the speed of a rotating fan was adjusted and its blades imaged such that, throughout the time it takes for a single blade to move across a pixel, forward motion is observed by that pixel. The exposure time of the ToF camera was set to 1.5 ms and the fan was captured from a frontal perspective (raw homodyne and heterodyne measurements shown in FIG. 7 bottom). The slope of the fan blades was manually measured, which is constant over the entire blades. The radius of the plotted position was measured, allowing calculation of the "ground truth" velocity when the rotation speed of the fan is known. Since the exact rotation speed is not actually known, it was measured by mounting a small pin on one of the blades and mounting a piece of flexible plastic in front of the fan, such that the rotating pin strikes the plastic exactly once per revolution, creating a distinct sound. The sound (sampled at 44 KHz, FIG. 7B) of this setup was measured (to estimate the ground truth velocity of the fan blades, observed by one pixel, which is compared with the corresponding D-ToF estimate (FIG. 7C). For this experiment, the estimation error is always below 0.2 m/s. Errors are mainly due to the low SNR of the measured Doppler-shifted signal.

Figure 7D:
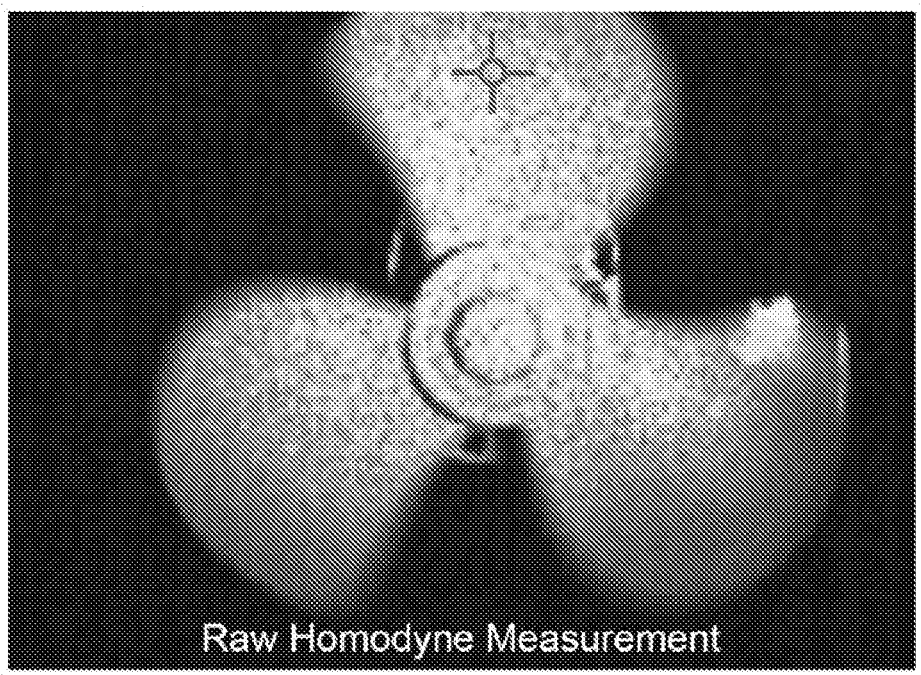
FIG. 7D shows the unprocessed full-field measurements of the homodyne frequency setting with the pixel indicated for which velocities were plotted in FIG. 7C.
Figure 7E:
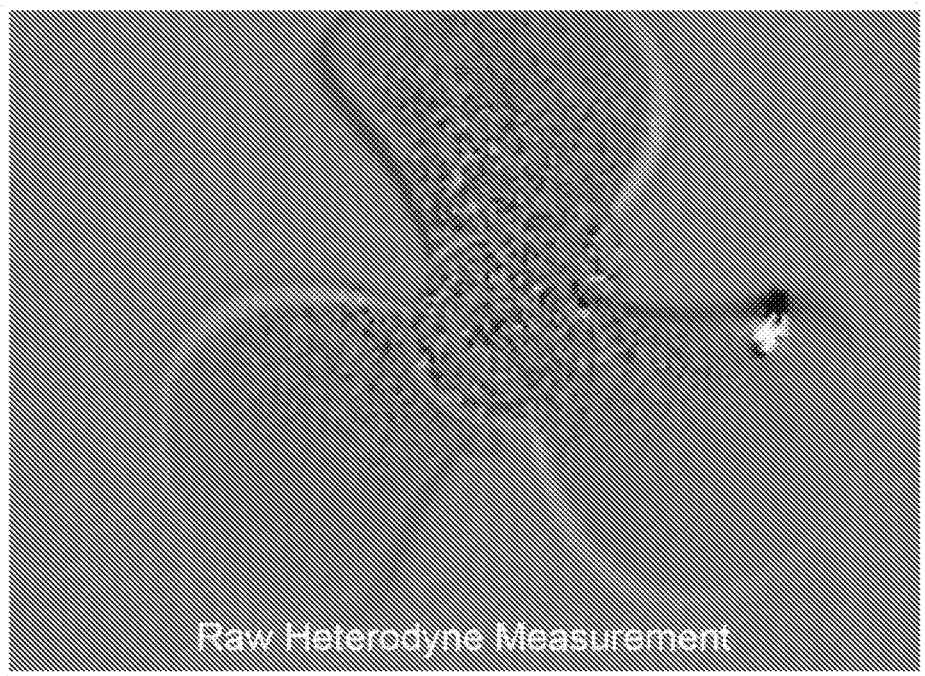
FIG. 7E shows the unprocessed full-field measurements of the heterodyne frequency setting with the pixel indicated for which velocities were plotted in FIG. 7C.
Figure 8A:
FIG. 8A depicts images of motion within a complex scene with ambient illumination and a large depth range.
Figure 8B:
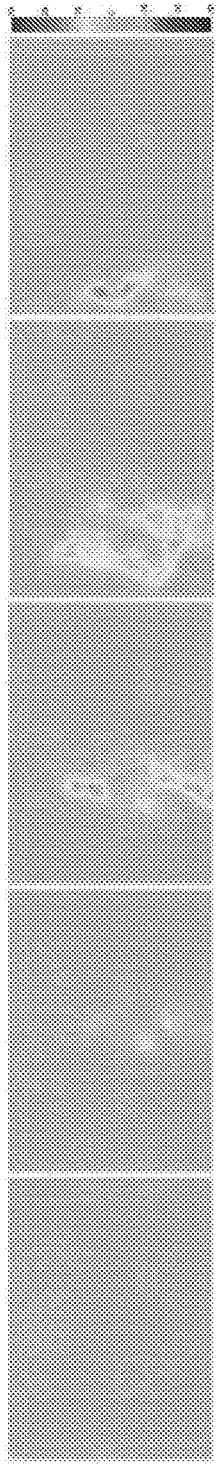
FIG. 8B depicts velocity data of motion within a complex scene with ambient illumination and a large depth range The velocity can be robustly estimated within the range of the illumination (approx. 5 m inside), even in outdoor settings.
Figure 10A:
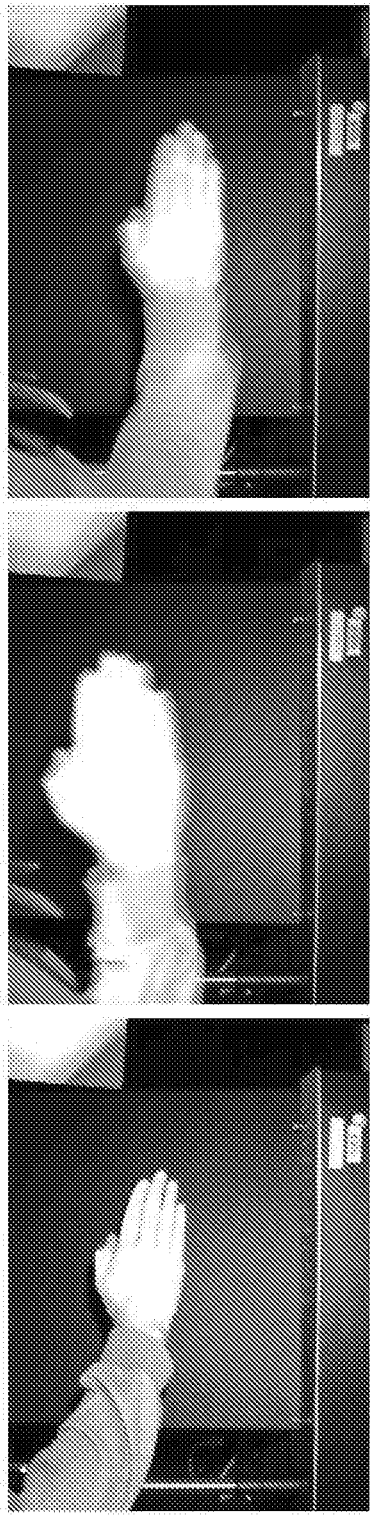
FIG. 10A depicts an example of periodic motion of a hand along the optical axis. The static scene on the left results in no response of the sensor, whereas forward (center) and backward (right) movement result in positive and negative responses respectively.
Figure 10B:
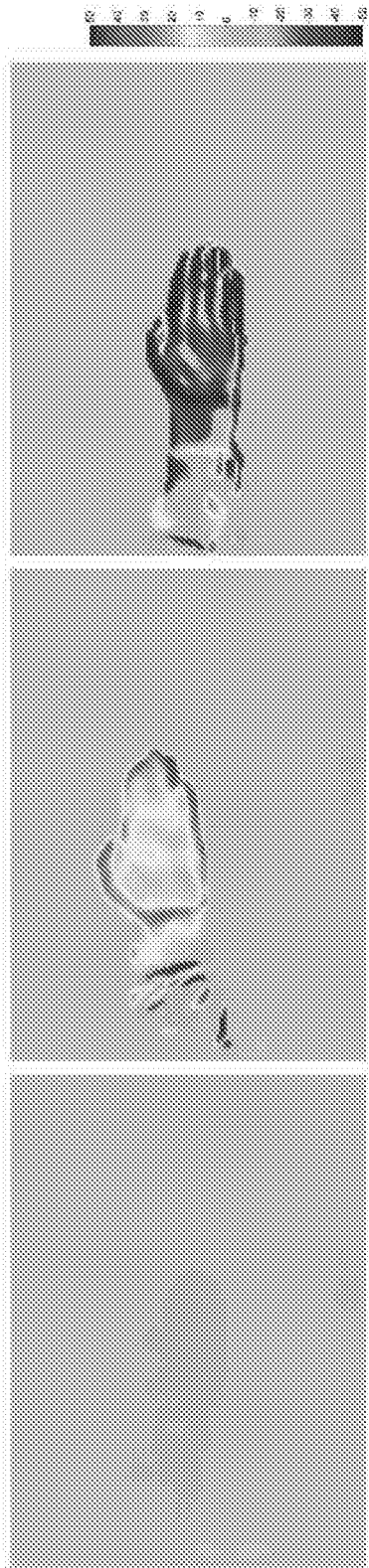
FIG. 10B depicts velocity data for the example in FIG. 10A.

Subframe Alignment. Although the required heterodyne and homodyne shots could be captured simultaneously using multi-sensor configurations, they are captured in an alternating fashion using the single-sensor solution used herein. Examples are shown in FIGS. 7C-7D. Since moving objects are involved, the individual shots cannot be assumed to be perfectly aligned, which results in velocity artifacts around edges in the scene. The artifacts can be mitigated, although not completely removed, by computing a SIFT flow on the raw data and warping them to a reference frame. While not perfect, the SIFT flow delivered sufficiently good warps for most captures.

Denoising. With the present system, an extremely small frequency shift (in the Hz range; for example a few Hz; for example 20 Hz or less, 15 Hz or less, 10 Hz or less, 7 Hz or less, 5 Hz or less) can be captured relative to the modulation frequency (the MHz range). Additionally, the quantum efficiency of emerging time-of-flight sensors is still far from that of modern solid state sensors [Erz and Jahne 2009]. Therefore, the slight Doppler shift in the present prototype can be affected by Poisson noise. Standard denoising methods fail in strong Poisson noise scenarios. In FIGS. 9A-B, velocity maps are coded in grayscale. The maps computed from raw measurements (FIG. 9A) are corrupted by Poisson noise. To account for this, a binning-based non-local means-type denoiser (denoising strategy) was applied to all captured or reconstructed velocity images or maps (FIG. 9B).

Experimental Results

The results captured with our prototype imaging system are shown in FIGS. 1A-G, 8A-B, 10A-B, 11A-C, 12A-B, 13A-C, 14A-C. The results validate the proposed imaging system for a variety of challenging indoor and outdoor scenes. Color images can be recorded with the same exposure time as the Time-of-Flight camera. Most of the scenes have a slight red tint. This is due to use of eye-safe red illumination in the visible spectrum. Like current commercial ToF cameras, future implementations of this system would most likely use invisible, near infrared wavelengths to encode velocity and depth information. The reconstructed velocity maps can be color-coded; absolute units can be indicated in the color bars. As expected, static scenes result in a constant velocity map whereas velocity is directly encoded in the measurements and subsequently reconstructed for each sensor pixel independently. In addition to the velocity maps, FIGS. 1D, 1G, 11C, 13C, and 14C also show the corresponding depth maps that can be estimated from an additional capture as well as the velocity maps (see Simultaneous Range and Velocity Section herein).

Figure 11A:
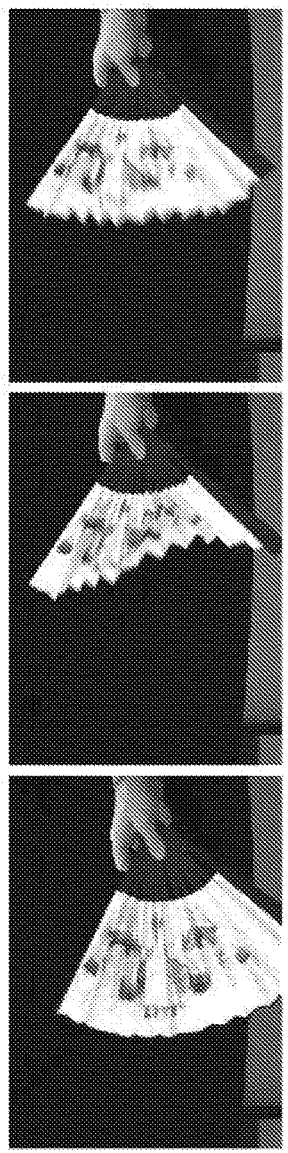
FIG. 11A depicts an example of periodic motion along the Z-axis for a textured object. Although the estimated velocity is mostly correct, shadows and dark scene parts can be challenging for robust velocity estimation.
Figure 11B:
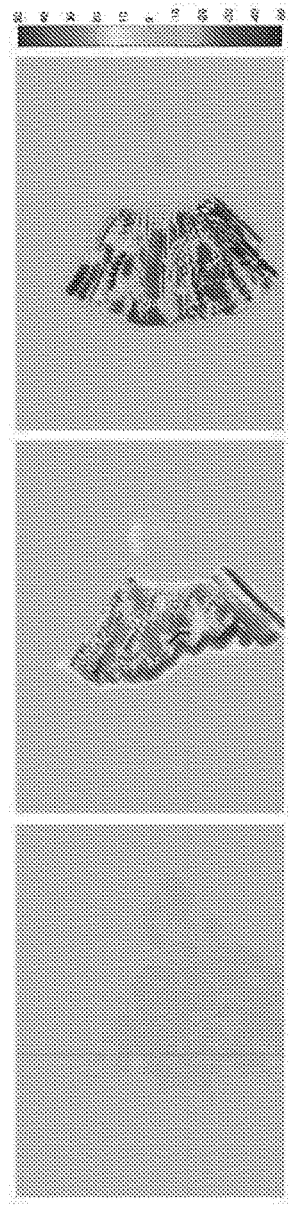
FIG. 11B depicts velocity data for the example in FIG. 11A.
Figure 11C:
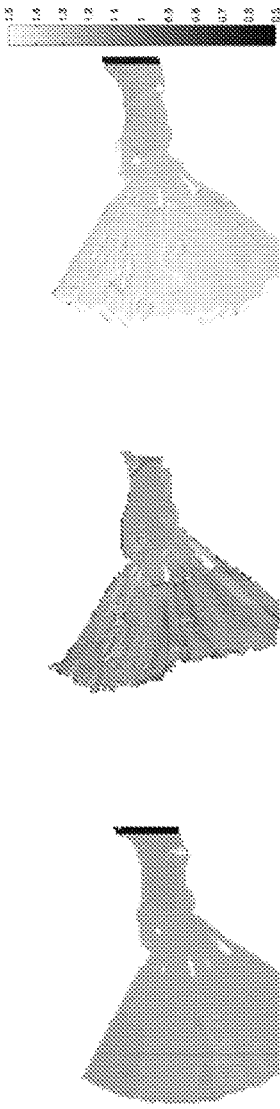
FIG. 11C depicts depth data for the example in FIG. 11A.
Figures 12A, 12B:
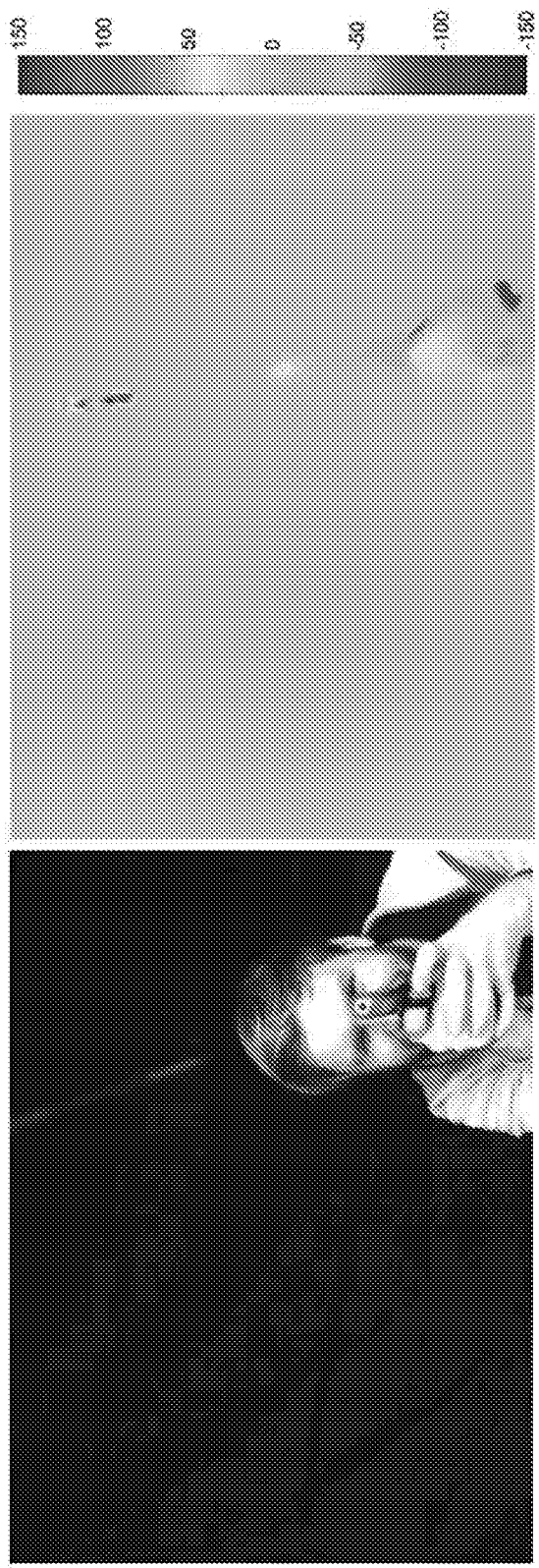
FIG. 12A shows an example of extremely fast motion that can be accurately captured with the present system.
FIG. 12B shows velocity data for the example in FIG. 12A. The Airsoft gun in the example is advertised as shooting bullets with 99 m/s; a radial velocity of 98.2 m/s (average of the peak pixels) can be calculated in the present example using the system and methods of the present disclosure.
Figure 13A:
FIG. 13A depicts an example of a potential applications of the present disclosure, including gaming and human—computer interaction. An example of a person in motion in a scene is depicted from left to right.
Figure 13B:
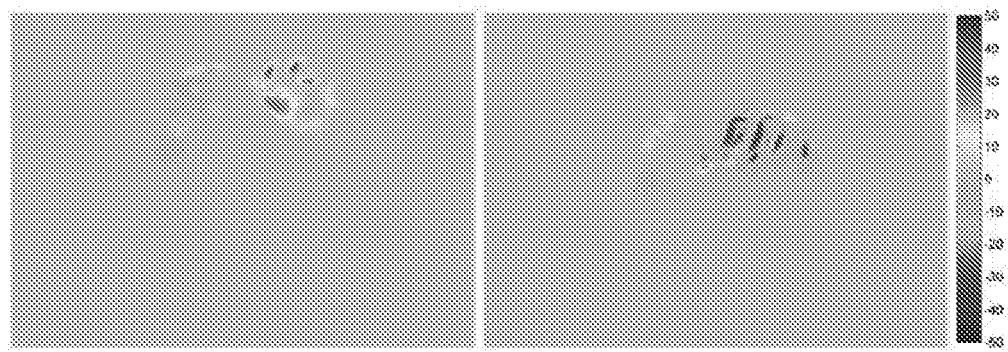
FIG. 13B shows velocity data for the example of FIG. 13A.
Figure 13C:
FIG. 13C shows depth data for the example of FIG. 13A.
Figure 14A:
FIG. 14A depicts an example of physical props for gaming, such as ping pong balls fired with a toy gun, which can be tracked with the present system and enable HCI techniques. Images of props in motion with a person in a scene is show across time from left to right.
Figure 14B:
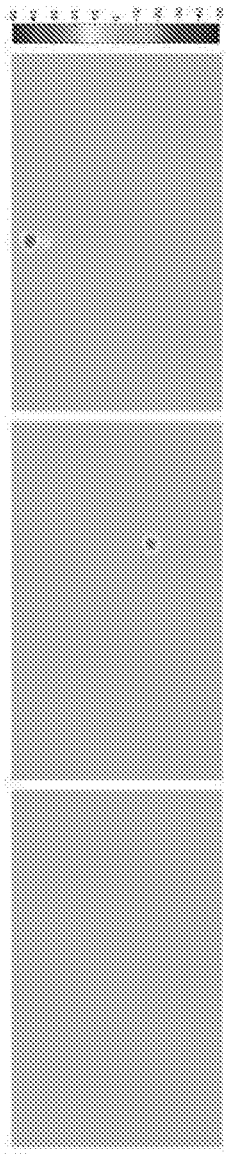
FIG. 14B shows velocity data for the example of FIG. 14A.
Figure 14C:
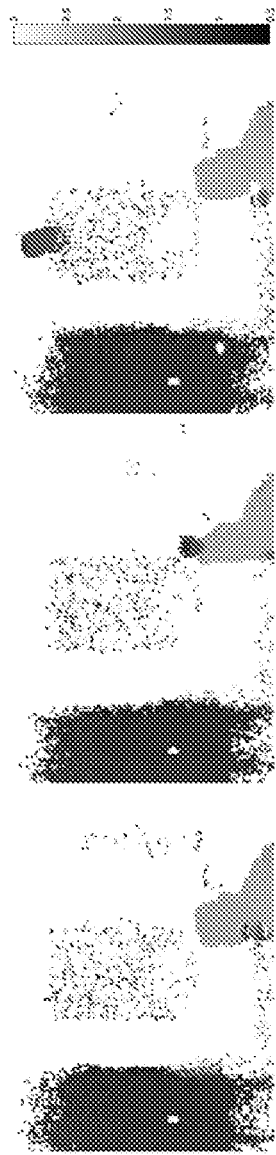
FIG. 14C shows depth data for the example of FIG. 14A.

The selection of scenes shows a wide range of motion types that can be reconstructed with the proposed method, but it also highlights several challenges of D-ToF and ToF in general. D-ToF requires two frames were captured, and aligned, recorded with a single camera. In some instances, such as FIGS. 10A-B and 12A-B, the alignment is challenging and any errors will propagate into the velocity maps, especially around depth-discontinuities. These artifacts can be mitigated by optimizing the camera firmware to minimizing switching time between the sub-frames or by using two co-axial ToF cameras. Objects with dark albedos, as for example observed in FIG. 11A, are challenging for any ToF method because only a small amount of the coded illumination is reflected back to the camera. Similarly, shadows are challenging and can result in either no depth/velocity estimation or errors (sweater in FIG. 8A and regions between fingers in FIG. 13A). Whereas some of these limitations can be overcome with better hardware, others are inherent to the time-of-flight approach.

Towards the 3D Velocity Field

Optical flow computed from conventional video sequences estimates the 2D projection of the 3D flow field onto the image plane. The radial component is usually lost. Furthermore, optical flow is an ill-posed problem and may fail in many scenarios. Our Doppler ToF addresses two problems of optical flow: first, it can help in cases where optical flow fails either due to large displacements or missing scene structures. Second, the present method can also help in cases where the optical flow estimation is successful; in this case, the 3D metric flow can be recovered by combining metric radial velocity and the 2D optical pixel flow.

FIG. 15A shows a scene where regular optical flow [Liu 2009], as well as SIFT-flow [Liu et al. 2008], fail due to limited structure in the scene (FIGS. 15B and 15C respectively). Both methods cannot recover the true 2D motion of the fan and wrongly segment the scene. The present orthogonal velocity estimation method successfully captures the velocity of the objects and also leads to a proper segmentation of the scene (FIG. 15D). Note that having additional depth estimates for conventional flow may only be of limited help since flat surfaces also do not deliver enough features for correspondence matching.

Figure 16A:
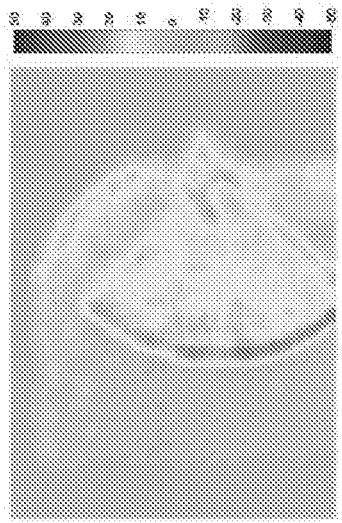
FIG. 16A depicts an example of a frame where optical flow computed reasonable estimates.
Figure 16A:
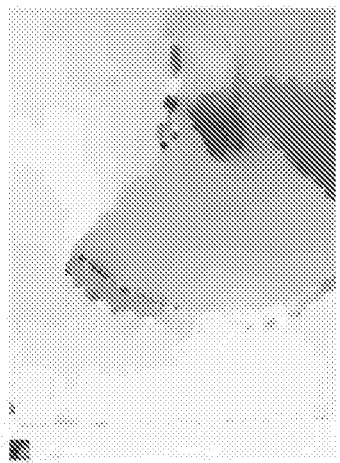
Figure 16A:
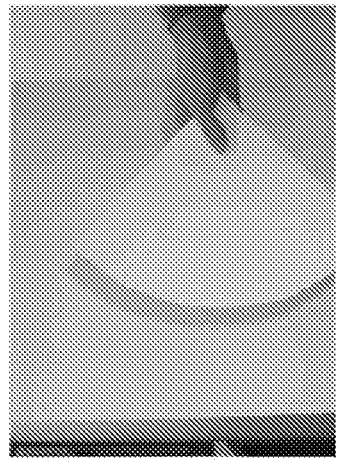
Figure 16B:
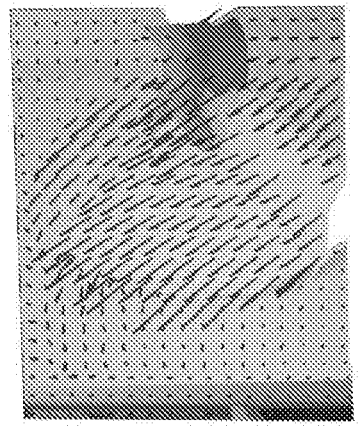
FIG. 16B show the full 3D velocity estimate for different views of the example in FIG. 16A. Optical flow can aid in 3D velocity estimates and image reconstruction.
Figure 16B:
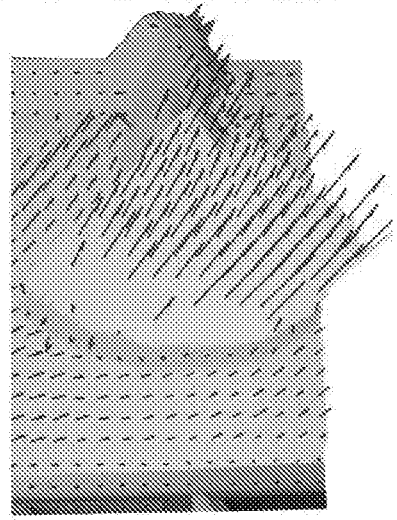
Figure 16B:
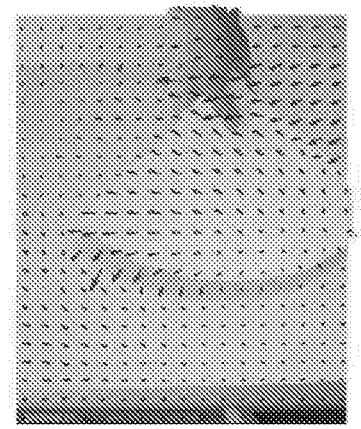

FIG. 16A shows a scene where the optical flow estimate is reasonable. In this case, the orthogonal component that our method captures completes the 2D spatial flow estimates and uniquely determines the full metric 3D flow. Given the optical flow estimates $f_x$, $f_y$ for the horizontal and vertical image coordinates, one can compute the metric velocity vectors $$v_x = \frac{f_x \cdot Z}{F}, f_y = \frac{f_x \cdot Z}{F},$$

where F is the focal length of the lens and Z the corresponding depth estimate from our method (see [Honegger et al. 2013]). In conjunction with the velocity estimate $v_z$ in the orthogonal direction along the optical axis, the full 3D metric flow is $V^- = (v_x, v_y, v_z)$. An example is shown in FIG. 16B. Note that the optical flow helps determine that the fan's velocity is slightly rotated to the upper right, where the center of rotation is located (bottom left). Also note that 3D flow field is only as reliable as the estimated radial velocity and the RGB 2D flow.

In summary, provided herein is a new computational imaging modality that directly captures radial object velocity via Doppler Time-of-Flight Imaging. A variety of experimental results captured with a prototype camera system are demonstrated for different types of motions and outdoor settings. The methods are extensively validated in simulation and experiment. In an aspect, the optional combination of footage captured using an RGB camera with the depth and velocity output of the present coded Time-of-Flight camera system is shown. Together, this data can represent simultaneous per-pixel RGB, depth, and velocity estimates of a scene and allow for the 3D velocity field to be estimated. Applications in a wide range of computer vision problems, including segmentation, recognition, tracking, super-resolution, spatially-varying motion de-blurring, and navigation of autonomous vehicles are provided.

The present method is complimentary to optical flow. It allows for the depth bias of xz-flow to be removed and enables recording of the metric 3D velocity field of the scene. However, if only radial velocity is required, the present method can also be used stand-alone, independent of optical flow.

Commercially available ToF sensors today are low-resolution and their quantum efficiency and noise characteristics are not comparable with modern CMOS sensors. Future generations of ToF sensors are expected to deliver significantly higher image quality, which would directly benefit the present method as well. Higher modulation frequencies would directly improve the signal-to-noise ratio in our setup, because the Doppler effect is proportional to these frequencies. For eye-safe operation, laser diodes can be used that operate in the visible spectrum in combination with a ToF sensor that has its visible spectrum cutoff filter removed. The laser illumination is therefore visible in all of the RGB images as a red tint. The present system can also operate the Time-of-Flight camera in the near infrared spectrum, as is common practice in commercial ToF cameras. Finally, all presented techniques can be easily be implemented on consumer Time-of-Flight cameras with the appropriate level of access to the system firmware or driver software.

Conclusion. Time-of-flight cameras have entered the consumer market only a few years ago, but transformed the way machines perceive the world. Human-computer interaction, medical imaging, robotics and machine vision, navigation for self-driving cars and quadcopters, and many other fundamental computer vision tasks have seen dramatic improvements using these devices. With Doppler Time-of-Flight, we provide a fundamentally new imaging modality that can impact all of these applications. Implementation of our method on existing consumer devices makes Doppler Time-of-Flight an attractive computational photography technique.

As will be apparent to those of skill in the art upon reading this disclosure, each of the individual embodiments described and illustrated has discrete components and features which may be readily separated from or combined with the features of any of the other several embodiments without departing from the scope or spirit of the present disclosure. Any recited method can be carried out in the order of events recited or in any other order logically possible.

Ratios, concentrations, amounts, and other numerical data may be expressed in a range format. It is to be understood that such a range format is used for convenience and brevity, and should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1% to about 5%, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figure of the numerical value. In addition, the phrase "about 'x' to Cy'" includes "about 'x' to about 'y'".

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

TABLE 1

Notation Table

| Notation | Description |
|---|---|
| $g(t)$ | illumination signal at the light source |
| $s(t)$ | illumination signal incident at the ToF sensor |
| $f_\psi(t)$ | sensor reference signal |
| $\omega_g$ | illumination frequency |
| $\omega_f$ | sensor modulation frequency |
| $\psi$ | programmable phase offset for sensor signal |
| $\phi$ | depth-dependent phase shift in illumination |
| $\Delta\omega$ | Doppler frequency shift |
| $i_\psi(t')$ | continuous, low-pass filtered sensor image |
| $i_\psi[t']$ | discretely-sampled, low-pass filtered sensor image |

REFERENCES

BARRON, J., FLEET, D., AND BEAUCHEMIN, S. 1994. Performance of optical flow techniques. IJCV 12, 1, 43-77.

BOREMAN, G. D. 2001. Modulation Transfer Function in Optical and ElectroOptical Systems. SPIE Publications.

BÜTTGEN, B., AND SEITZ, P. 2008. Robust optical time-of-flight range imaging based on smart pixel structures. IEEE Trans. Circuits and Systems 55, 6, 1512-1525.

CEPERLEY, P., 2015. Resonances, waves and fields. http://resonanceswavesandfields.blogspot.com/2011/04/28-valid-method-of-multiplying-two.html. [Online; accessed 20 Jan. 2015].

DOPPLER, C. J. 1842. Über das farbige Licht der Doppelsterne and einiger anderer Gestirne des Himmels. Abhandlungen der Königl. Böhm. Gesellschaft der Wissenschaften 12, 2, 465-482.

DORRINGTON, A. A., CREE, M. J., PAYNE, A. D., CONROY, R. M., AND CARNEGIE, D. A. 2007. Achieving sub-millimetre precision with a solid-state full-field heterodyning range imaging camera. In Proc. Meas. Sci. Technol., vol. 18.

ERZ, M., AND JÄHNE, B. 2009. Radiometric and spectrometric calibrations, and distance noise measurement of ToF cameras. In Dynamic 3D Imaging. Springer, 28-41.

GOKTURK, S., YALCIN, H., AND BAMJI, C. 2004. A time-offlight depth sensor—system description, issues and solutions. In Proc. CVPR, 35-35.

GU, J., HITOMI, Y., MITSUNAGA, T., AND NAYAR, S. 2010. Coded Rolling Shutter Photography: Flexible Space-Time Sampling. In Proc. ICCP.

GUPTA, M., NAYAR, S. K., HULLIN, M., AND MARTIN, J. 2014. Phasor Imaging: A Generalization Of Correlation-Based Time-of-Flight Imaging. Tech. rep., June.

HEIDE, F., HULLIN, M. B., GREGSON, J., AND HEIDRICH, W. 2013. Low-budget transient imaging using photonic mixer devices. ACM Trans. Graph. (SIGGRAPH) 32, 4, 45:1-45:10.

HEIDE, F., XIAO, L., HEIDRICH, W., AND HULLIN, M. B. 2014. Diffuse mirrors: 3D reconstruction from diffuse indirect illumination using inexpensive time-of-flight sensors. In Proc. CVPR.

HEIDE, F., XIAO, L., KOLB, A., HULLIN, M. B., AND HEIDRICH, W. 2014. Imaging in scattering media using correlation image sensors and sparse convolutional coding. OSA Opt. Exp. 22, 21, 26338-26350.

HONEGGER, D., MEIER, L., TANSKANEN, P., AND POLLEFEYS, M. 2013. An open source and open hardware embedded metric optical flow CMOS camera for indoor and outdoor applications. In Proc. ICRA, IEEE, 1736-1741.

HONTANI, H., OISHI, G., AND KITAGAWA, T. 2014. Local estimation of high velocity optical flow with correlation image sensor. In Proc. ECCV, 235-249.

HORN, B., AND SCHUNCK, B. 1981. Determining optical flow. Artificial Intelligence 17, 185-203.

KADAMBI, A., WHYTE, R., BHANDARI, A., STREETER, L., BARSI, C., DORRINGTON, A., AND RASKAR, R. 2013. Coded time of flight cameras: sparse deconvolution to address multipath interference and recover time profiles. ACM Trans. Graph. (SIGGRAPH Asia) 32, 6.

KIRMANI, A., HUTCHISON, T., DAVIS, J., AND RASKAR, R. 2009. Looking around the corner using transient imaging. In Proc. ICCV, 159-166.

LANGE, R., AND SEITZ, P. 2001. Solid-state time-of-flight range camera. IEEE J. Quantum Electronics 37, 3, 390-397.

LINDNER, M., AND KOLB, A. 2006. Lateral and depth calibration of PMD-distance sensors. In Advances in Visual Computing. Springer, 524-533.

LIU, C., YUEN, J., TORRALBA, A., SIVIC, J., AND FREEMAN, W. T. 2008. SIFT flow: Dense correspondence across different scenes. In Computer Vision—ECCV 2008. Springer, 28-42.

LIU, C. 2009. Beyond pixels: exploring new representations and applications for motion analysis. PhD thesis, MIT.

NAIK, N., ZHAO, S., VELTEN, A., RASKAR, R., AND BALA, K. 2011. Single view reflectance capture using multiplexed scattering and time-of-flight imaging. ACM Trans. Graph. (SIGGRAPH Asia) 30, 6, 171:1-171:10.

O'TOOLE, M., HEIDE, F., XIAO, L., HULLIN, M. B., HEIDRICH, W., AND KUTULAKOS, K. N. 2014. Temporal frequency probing for 5d transient analysis of global light transport. ACM Trans. Graph. (SIGGRAPH) 33, 4, 87:1-87:11.

PANDHARKAR, R., VELTEN, A., BARDAGJY, A., LAWSON, E., BAWENDI, M., AND RASKAR, R. 2011. Estimating motion and size of moving non-line-of-sight objects in cluttered environments. In Proc. CVPR, 265-272.

TOCCI, M., KISER, C., TOCCI, N., AND SEN, P. 2011. A versatile HDR video production system. ACM Trans. Graph. (SIGGRAPH) 30, 4, 41.

VELTEN, A., WILLWACHER, T., GUPTA, O., VEERARAGHAVAN, A., BAWENDI, M., AND RASKAR, R. 2012. Recovering three dimensional shape around a corner using ultrafast time-of-flight imaging. Nat Commun 745, 3.

VELTEN, A., WU, D., JARABO, A., MASIA, B., BARSI, C., JOSHI, C., LAWSON, E., BAWENDI, M., GUTIERREZ, D., AND RASKAR, R. 2013. Femto-photography: Capturing and visualizing the propagation of light. ACM Trans. Graph. (SIGGRAPH) 32, 4, 44:1-44:8.

WEI, D., MASUREL, P., KURIHARA, T., AND ANDO, S. 2006. Optical flow determination with complex-sinusoidally modulated imaging. In Proc. ICSP, vol. 2.

WU, D., WETZSTEIN, G., BARSI, C., WILLWACHER, T., O'TOOLE, M., NAIK, N., DAI, Q., KUTULAKOS, K.,

AND RASKAR, R. 2012. Frequency analysis of transient light transport with applications in bare sensor imaging. In Proc. ECCV, 542-555.

YASUMA, F., MITSUNAGA, T., ISO, D., AND NAYAR, S. K. 2010. Generalized assorted pixel camera: postcapture control of resolution, dynamic range, and spectrum. IEEE TIP 19, 9, 2241-2253.

Therefore, the following is claimed:

1. A method for imaging an object's velocity, the method comprising the steps of:
- illuminating an object in motion with an amplitude-modulated signal g having an illumination frequency $\omega_g$;
- capturing, using a Time-of-Flight camera, first and second signals s representative of the object in motion, each over an exposure time T;
- modulating each of the first and second signals s with a modulation frequency $\omega_f$ within the exposure time T, at a sensor of the Time-of-Flight camera, to obtain corresponding first and second modulated signals $\tilde{i}_\psi$, wherein the first modulated signal $\tilde{i}_\psi$ corresponds to a heterodyne measurement, and the second modulated signal $\tilde{i}_\psi$ corresponds a homodyne measurement; and
- extracting information about a Doppler shift from the first and second modulated signals $\tilde{i}_\psi$ to obtain a measurement of an instantaneous per pixel radial velocity of the object in motion,
- wherein for the heterodyne measurement, the illumination frequency $\omega_g$ is different from the modulation frequency $\omega_f$, and for the homodyne measurement, the illumination frequency $\omega_g$ is equal to the modulation frequency $\omega_f$.

2. The method of claim 1, wherein the radial velocity of the object in motion is simultaneously captured for each pixel captured within the exposure time.

3. The method of claim 1, wherein the illumination frequency is coded orthogonal to the modulation frequency so that the exposure time T is an integer multiple of periods corresponding to the illumination frequency and the modulation frequency.

4. The method of claim 1, wherein the instantaneous per pixel radial velocity of the object in motion is given by a ratio of (1) the first modulated signal $\tilde{i}_\psi$ corresponding to the heterodyne measurement, and (2) the second modulated signal $\tilde{i}_\psi$ corresponding to the homodyne measurement.

5. The method of claim 1, wherein the heterodyne measurement is simultaneously captured with the homodyne measurement on corresponding Time-of-Flight cameras.

6. The method of claim 1, wherein the exposure time is longer than the wavelength of a modulated captured signal.

7. The method of claim 1, wherein the heterodyne measurement and the homodyne measurement are alternately captured with the Time-of-Flight camera.

8. The method of claim 1, further including the step of: simultaneously capturing color, depth and velocity information concerning the object in motion during the exposure time.

9. The method of claim 8, wherein an optical flow of the object in motion is computed on red, green and blue (RGB) frames within a measured change in the illumination frequency.

10. The method of claim 9, including estimating a 3D velocity field for the object in motion.

11. The method of claim 1, wherein depth and velocity imaging are combined either using the Time-of-Flight camera by alternating modulation frequencies between successive video frames over the exposure time or using at least two Time-of-Flight cameras.

12. A system for imaging an object's velocity, the system comprising:
- at least one device for illuminating an object in motion with an amplitude-modulated signal q having an illumination frequency $\omega_g$ and for capturing first and second signals s representative of the object in motion over an exposure time T;
- at least one computing device comprising a processor and a memory; and
- an application executable on the at least one computing device, the application comprising machine readable instructions stored in the memory that, when executed by the processor, cause the computing device to at least:
  - modulating each of the first and second signals s with a modulation frequency $\omega_f$ within the exposure time T, to obtain corresponding first and second modulated signals $\tilde{i}_\psi$, wherein the first modulated signal $\tilde{i}_\psi$ corresponds to a heterodyne measurement, and the second modulated signal $\tilde{i}_\psi$ corresponds a homodyne measurement; and
  - extract information about a Doppler shift from the first and second modulated signals $\tilde{i}_\psi$ to obtain a measurement of an instantaneous per pixel radial velocity of the object in motion,
- wherein for the heterodyne measurement, the illumination frequency $\omega_g$ is different from the modulation frequency $\omega_f$, and for the homodyne measurement, the illumination frequency $\omega_g$ is equal to the modulation frequency $\omega_f$.

13. The system of claim 12, wherein the device is at least one Time-of-Flight camera.

14. The system of claim 12, wherein the radial velocity of the object in motion is simultaneously captured for each pixel captured within the exposure time.

15. The system of claim 12, wherein the illumination frequency is coded orthogonal to the modulation frequency so that the exposure time T is an integer multiple of periods corresponding to the illumination frequency and the modulation frequency.

16. The system of claim 12, wherein the instantaneous per pixel radial velocity of the object in motion is given by a ratio of (1) the first modulated signal $\tilde{i}_\psi$ corresponding to the heterodyne measurement, and (2) the second modulated signal $\tilde{i}_\psi$ corresponding to the homodyne measurement.

17. The system of claim 12, wherein the heterodyne measurement is simultaneously captured with the homodyne measurement on corresponding Time-of-Flight cameras.

18. The system of claim 12, wherein the logic captures color, depth and velocity information concerning the object in motion during the exposure time.

19. A non-transitory computer readable medium employing an executable application in at least one computing device, the executable application comprising machine readable instructions stored in the medium that:
- controls illuminating an object in motion with an amplitude-modulated signal g having an illumination frequency $\omega_g$;
- captures first and second signals s representative of the object in motion over an exposure time T;
- modulates each of the first and second signals s with a modulation frequency $\omega_f$ within the exposure time T at a sensor of the Time-of-Flight camera, to obtain corresponding first and second modulated signals $\tilde{i}_\psi$ wherein the first modulated signal $\tilde{i}_\psi$ corresponds to a heterodyne measurement, and the second modulated signal $\tilde{i}_\psi$ corresponds a homodyne measurement; and extracts information about a Doppler shift from the first and second modulated signals $\tilde{i}_\psi$ to obtain a measurement of an instantaneous per pixel radial velocity of the object in motion, wherein for the heterodyne measurement, the illumination frequency $\omega_g$ is different from the modulation frequency $\omega_f$, and for the homodyne measurement, the illumination frequency $\omega_g$ is equal to the modulation frequency $\omega_f$.

20. The non-transitory computer readable medium of claim 19, wherein the first and second signals s are captured using at least one Time-of-Flight camera.

* * * * *